(12) United States Patent
Abhyanker

(10) Patent No.: US 8,660,897 B2
(45) Date of Patent: Feb. 25, 2014

(54) NEAR-FIELD COMMUNICATION ENABLED WEARABLE APPAREL GARMENT AND METHOD TO CAPTURE GEOSPATIAL AND SOCIALLY RELEVANT DATA OF A WEARER OF THE WEARABLE APPAREL GARMENT AND/OR A USER OF A READER DEVICE ASSOCIATED THEREWITH

(75) Inventor: Raj Vasant Abhyanker, Cupertino, CA (US)

(73) Assignee: Raj V. Abhyanker, Cupertino, CA (US)

( * ) Notice: Subject to any disclaimer, the term of this patent is extended or adjusted under 35 U.S.C. 154(b) by 92 days.

(21) Appl. No.: 13/272,245

(22) Filed: Oct. 13, 2011

(65) Prior Publication Data
US 2013/0073375 A1    Mar. 21, 2013

Related U.S. Application Data

(63) Continuation of application No. 13/236,964, filed on Sep. 20, 2011.

(51) Int. Cl.
*G06Q 30/00* (2012.01)
(52) U.S. Cl.
USPC ............... 705/14.64; 705/14.52; 705/14.5; 705/14.22
(58) Field of Classification Search
USPC .......................................................... 705/14
See application file for complete search history.

(56) References Cited

U.S. PATENT DOCUMENTS

| | | | |
|---|---|---|---|
| 6,711,414 B1 * | 3/2004 | Lightman et al. ............. 455/517 |
| 7,119,659 B2 | 10/2006 | Bonalle | |
| 7,374,082 B2 | 5/2008 | Van de Velde | |
| 7,454,370 B2 | 11/2008 | Baril | |
| 7,565,108 B2 | 7/2009 | Kotola | |
| 7,681,788 B2 | 3/2010 | Van de Velde | |
| 7,702,538 B2 | 4/2010 | Rau | |
| 7,702,813 B2 | 4/2010 | Andreasson | |
| 7,748,618 B2 | 7/2010 | Vawter | |
| 7,756,467 B2 | 7/2010 | Bent et al. | |
| 7,843,343 B2 | 11/2010 | Thorn | |
| 7,909,243 B2 | 3/2011 | Yatsun | |
| 7,937,291 B2 | 5/2011 | Patrick Shu Pui | |
| 7,945,492 B1 | 5/2011 | Sun | |
| 7,980,378 B2 | 7/2011 | Jones | |
| 8,032,413 B2 | 10/2011 | Carlson | |

(Continued)

FOREIGN PATENT DOCUMENTS

| | | |
|---|---|---|
| EP | 1954008 A2 | 8/2008 |
| WO | 2008134529 A1 | 11/2008 |
| WO | 2010056480 A1 | 5/2010 |
| WO | 2011106443 A1 | 9/2011 |

*Primary Examiner* — John G Weiss
*Assistant Examiner* — Eric Netzloff
(74) *Attorney, Agent, or Firm* — Raj Abhyanker, P.C.

(57) ABSTRACT

A method includes providing, through a server device, a number of wearable apparel garments to an entity and monitoring readings of near-field communication tags associated with the number of wearable apparel garments procured from the entity through a number of reader devices of a corresponding number of another human mammals. The method also includes transmitting a profile information of the human mammal wearing the wearable apparel garment to the reader device of the another human mammal and/or a geospatial information of the reader device to the server device configured to collect information from the number of reader devices. Further, the method includes obtaining, through the server device and/or another server device, information related to market intelligence based on the transmitted profile information and/or the geospatial information.

1 Claim, 20 Drawing Sheets

(56) References Cited

U.S. PATENT DOCUMENTS

| | | | |
|---|---|---|---|
| 8,107,879 B2 * | 1/2012 | Pering et al. | 455/41.1 |
| 8,228,196 B1 * | 7/2012 | Thornton | 340/572.1 |
| 2007/0239981 A1 | 10/2007 | Lessing | |
| 2008/0133930 A1 | 6/2008 | Moshir | |
| 2008/0139306 A1 | 6/2008 | Lutnick | |
| 2008/0167060 A1 | 7/2008 | Moshir | |
| 2008/0248781 A1 | 10/2008 | Cedo Perpinya | |
| 2008/0251580 A1 | 10/2008 | Van de Velde | |
| 2008/0262928 A1 | 10/2008 | Michaelis | |
| 2008/0270300 A1 | 10/2008 | Sebastian | |
| 2008/0270302 A1 | 10/2008 | Beenau | |
| 2008/0307112 A1 | 12/2008 | Andreasson | |
| 2009/0265163 A1 | 10/2009 | Robert | |
| 2009/0276300 A1 | 11/2009 | Shaw | |
| 2009/0320106 A1 | 12/2009 | Jones | |
| 2009/0327308 A1 | 12/2009 | Carter | |
| 2010/0079338 A1 * | 4/2010 | Wooden et al. | 342/357.09 |
| 2010/0207742 A1 | 8/2010 | Buhot et al. | |
| 2010/0301113 A1 | 12/2010 | Bohn | |
| 2010/0306075 A1 | 12/2010 | Drance | |
| 2010/0325006 A1 | 12/2010 | White | |
| 2011/0004547 A1 | 1/2011 | Giordano | |
| 2011/0004550 A1 | 1/2011 | Giordano | |
| 2011/0010292 A1 | 1/2011 | Giordano | |
| 2011/0010293 A1 | 1/2011 | Giordano | |
| 2011/0022655 A1 | 1/2011 | Pinnick | |
| 2011/0025816 A1 | 2/2011 | Brewer | |
| 2011/0029363 A1 | 2/2011 | Gillenson | |
| 2011/0060640 A1 | 3/2011 | Thompson | |
| 2011/0082747 A1 | 4/2011 | Khan | |
| 2011/0098056 A1 | 4/2011 | Rhoads | |
| 2011/0173075 A1 | 7/2011 | Carlson | |
| 2011/0178924 A1 | 7/2011 | Briscoe | |
| 2011/0180598 A1 | 7/2011 | Morgan | |
| 2011/0191181 A1 | 8/2011 | Blackhurst | |
| 2011/0213225 A1 | 9/2011 | Bernstein | |
| 2011/0213664 A1 | 9/2011 | Osterhout | |
| 2011/0218864 A1 | 9/2011 | Pentz | |
| 2011/0221657 A1 | 9/2011 | Haddick | |
| 2011/0231266 A1 | 9/2011 | Baril | |
| 2012/0224076 A1 * | 9/2012 | Niedermeyer et al. | 348/211.2 |
| 2012/0232958 A1 * | 9/2012 | Silbert | 705/7.34 |
| 2013/0041761 A1 * | 2/2013 | Voda | 705/14.68 |

* cited by examiner

NEAR-FIELD COMMUNICATION ENABLED WEARABLE APPAREL GARMENT AND METHOD TO CAPTURE GEOSPATIAL AND SOCIALLY RELEVANT DATA OF A WEARER OF THE WEARABLE APPAREL GARMENT AND/OR A USER OF A READER DEVICE ASSOCIATED THEREWITH

CLAIM OF PRIORITY

This is a continuation application and claims priority to U.S. Utility application Ser. No. 13/236,964 titled "NEAR-FIELD COMMUNICATION ENABLED WEARABLE APPAREL GARMENT AND METHOD TO CAPTURE GEOSPATIAL AND SOCIALLY RELEVANT DATA OF A WEARER OF THE WEARABLE APPAREL GARMENT AND/OR A USER OF A READER DEVICE ASSOCIATED THEREWITH field on Sep. 20, 2011.

FIELD OF TECHNOLOGY

This disclosure relates generally to apparel garment(s) and, more particularly, to a method, an apparatus and/or a system of a near-field communication enabled wearable apparel garment to capture geospatial and socially relevant data of a wearer of the wearable apparel garment and/or a user of a reader device associated therewith.

BACKGROUND

An entity (e.g., a church, a school, a business, an organization, a politician etc.) may promote a brand (e.g., Nike®, Coca-Cola®) through wearable apparel (e.g., a shirt, a hat, a glove, etc.) displaying the brand. The entity may wish to raise public awareness of a good and/or a service thereof through the recipients of the wearable apparel physically wearing that promotional apparel.

The entity may spend valuable marketing funds in purchasing the wearable apparel. However, it may be difficult to measure a return on investment associated with the wearable apparel because the entity may not be able to track impact on behaviors of those who view the brand on the wearable apparel worn by the recipients thereof. Furthermore, the entity may not be able to identify which recipients are the ones most likely to wear the wearable apparel, and thereby, more likely to promote the brand of the entity. As such, purchase and distribution of the wearable apparel to promote the brand of the entity may be limited.

SUMMARY

Disclosed are a method, an apparatus and/or a system of a near-field communication enabled wearable apparel garment to capture geospatial and socially relevant data of a wearer of the wearable apparel garment and/or a user of a reader device associated therewith.

In one aspect, a method includes providing, through a server device, a number of wearable apparel garments to an entity, and monitoring readings of the near-field communication tags associated with the number of wearable apparel garments procured from the entity through a number of reader devices of a corresponding number of another human mammals. Each wearable apparel garment of the number of wearable apparel garments includes a textile region configured to cover an epidermis region of a human mammal, a near-field communication tag coupled to the textile region of the wearable apparel garment at an externally visible area thereof, and a message communication area adjacent to the near-field communication tag configured to direct a responsive action of another human mammal in establishing a communication link between a reader device of the another human mammal and the near-field communication tag.

The method also includes transmitting, through the communication link, a profile information of the human mammal wearing the wearable apparel garment to the reader device of the another human mammal and/or a geospatial information of the reader device to the server device configured to collect information from the number of reader devices. Further, the method includes obtaining, through the server device and/or another server device, information related to market intelligence based on the transmitted profile information of the human mammal and/or the geospatial information of the reader device associated with the another human mammal.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system and/or an apparatus of a near-field communication enabled wearable apparel garment to capture geospatial and socially relevant data of a wearer of the wearable apparel garment and/or a user of a reader device associated therewith. Although the present embodiments have been described with reference to specific example embodiments, it will be evident that various modifications and changes may be made to these embodiments without departing from the broader spirit and scope of the various embodiments.

Figure 1:
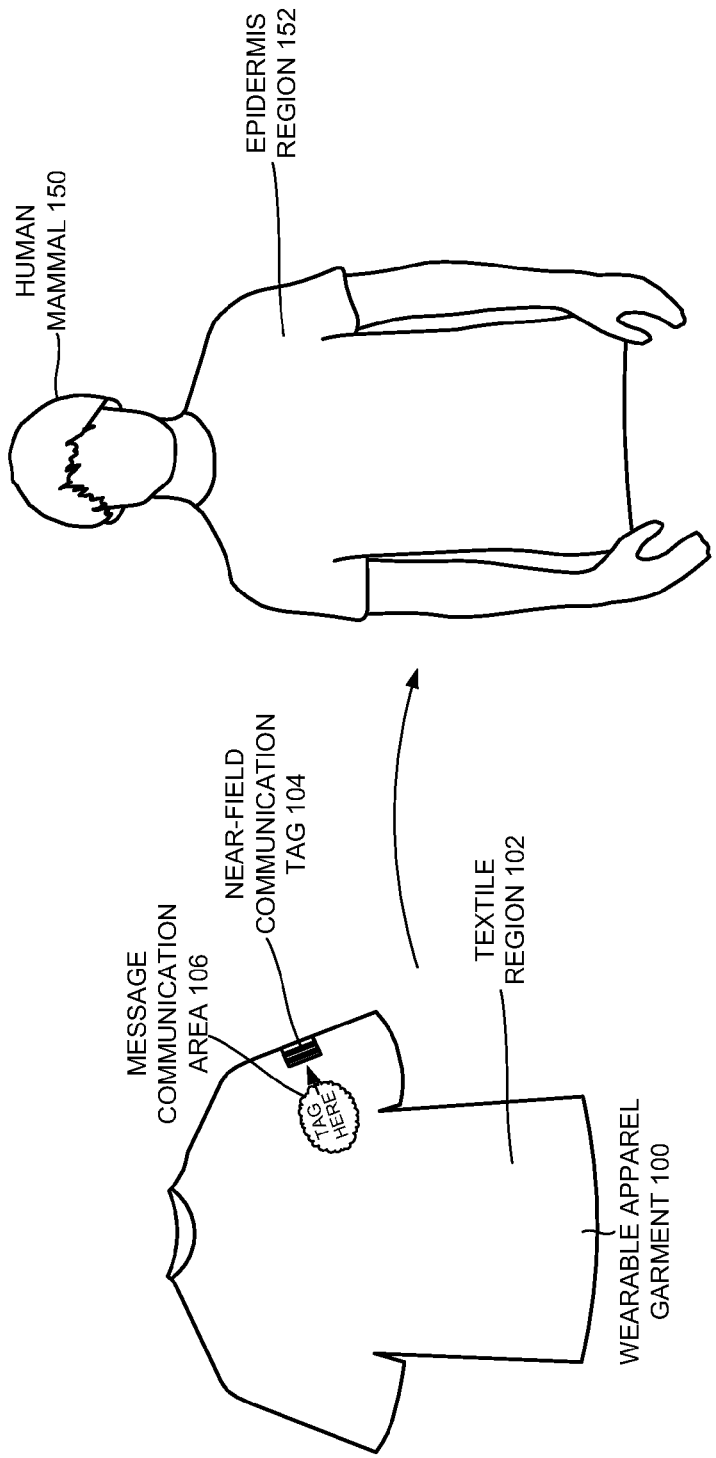
FIG. 1 is a schematic view of a wearable apparel garment configured to be worn by a human mammal, according to one or more embodiments.

FIG. 1 shows a wearable apparel garment 100 configured to be worn by a human mammal 150, according to one or more embodiments. Although FIG. 1 shows wearable apparel garment 100 as a shirt, wearable apparel garment 100 may also be a jacket, a hat and/or a glove. Other examples of wearable apparel garment 100 are within the scope of the exemplary embodiments discussed herein. In one or more embodiments, wearable apparel garment 100 may include a textile region 102 to cover an epidermis region 152 of human mammal 150 (e.g., a human being). In one or more embodiments, wearable apparel garment 100 may include a near-field communication tag 104 coupled thereto at an externally visible area of textile region 102.

In one or more embodiments, the externally visible area of textile region 102 may be a shoulder area of wearable apparel garment 100. The shoulder area may be chosen based on a high visibility thereof to other human mammal(s) within the vicinity of human mammal 150. In one or more embodiments, near-field communication tag 104 may be coated with a water-resistant material that protects a memory region and a communication area (e.g., antenna region) associated therewith from water and corrosive washing while permitting a reading of near-field communication tag 104 by a reader device. It is obvious that other externally visible areas(s) of textile region 102 may be chosen for the provision of near-field communication tag 104. In one or more embodiments, a message communication area 106 may be adjacent to near-field communication tag 104 in order to increase visibility thereof. For example, message communication area 106 may be a print (or, a sewn indicator) on wearable apparel garment 100 that reads "Tag here" (as shown in FIG. 1), followed by an arrow pointing to near-field communication tag 104. Variations in the indication through message communication area 106 are within the scope of the exemplary embodiments. For example, message communication area 106 may indicate "Touch here," instead of "Tag here."

In one or more embodiments, the presence of message communication area 106 may aid in the direction of a responsive action by another human mammal by way of "reading" near-field communication tag 104. In one or more embodiments, the another human mammal may "read" near-field communication tag 104 through a portable communication device (e.g., a mobile phone) having an appropriate near-field communication tag reader provided therein.

In one or more embodiments, near-field communication tag 104 may be sewn onto the externally visible area of textile region 102. Alternately, in one or more embodiments, near-field communication tag 104 may be removably coupled to the externally visible area of textile region (e.g., provided on a sticker, button, badge, attached through VELCRO® means). In one or more embodiments, near-field communication tag 104 may be appropriately provided such that near-field communication tag 104 withstands washing of wearable apparel garment 100.

Figure 2:
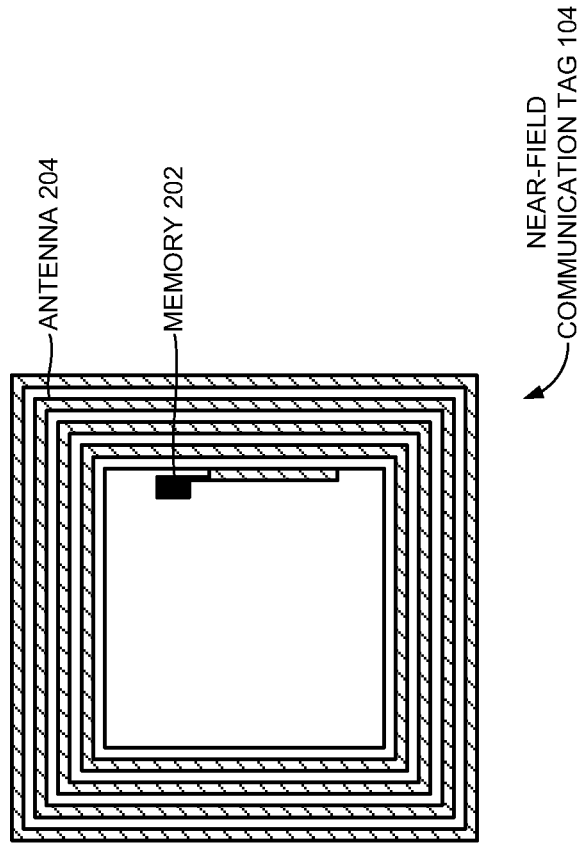
FIG. 2 is a schematic view of a near-field communication tag of the wearable apparel garment of FIG. 1, according to one or more embodiments.

FIG. 2 shows near-field communication tag 104, according to one or more embodiments. In one or more embodiments, near-field communication tag 104 may include an integrated circuit memory (e.g., memory 202) and an antenna 204. In one or more embodiments, memory 202 may be rewritable, read-only or writable-once. In one or more embodiments, near-field communication tag 104 may be passive, and may be powered through an appropriate tag reader (e.g., located on a mobile phone). Due to the passivity of near-field communication tag 104 and, therefore, the lack of need of a power supply (e.g., battery), the size thereof may be conducive to utilization in wearable apparent garment 100.

In one or more embodiments, antenna 204 of near-field communication tag 104 may serve as a coil configured to be inductively coupled to a coil of the appropriate tag reader when the aforementioned tag reader is physically brought close thereto. In one or more embodiments, another human mammal associated with a near-field communication enabled device (e.g., a mobile phone with the tag reader) may "touch" (or, "tag") the aforementioned device onto near-field communication tag 104 to enable communication between the device (e.g., through the tag reader) and near-field communication tag 104. Thus, in one or more embodiments, the antenna of the tag reader and antenna 204 of near-field communication tag may be in "near-field" communication with one another. In one or more embodiments, the "near-field" communication distance may be smaller (e.g., <4 cm) compared to the communication distance between a Radio-Frequency Identification (RFID) tag. Therefore, near-field communication tag 104 may be preferred to an RFID tag in the exemplary embodiments discussed herein.

In one or more embodiments, near-field communication tag 104 and tag reader may operate within a globally available radio frequency band (e.g., 13.56 MHz). In one or more embodiments, memory 202 of near-field communication tag 104 may be powered through antenna 204 picking up power from the tag reader. In one or more embodiments, near-field communication tag 104 may then be enabled to transfer information to the tag reader. In one or more embodiments, memory 202 may store information such as one or more Uniform Resource Locator(s) (URL(s)) to be transferred to the tag reader held by the another mammal, from where the another mammal may locate further information. It is obvious that memory 202 may also store information other than URL(s). Example scenario(s) of information being stored and/or exchanged will be discussed below.

In one or more embodiments, communication between near-field communication tag 104 and the tag reader may be in accordance with standard(s) defined by the Near-Field Communication (NFC) forum. Thus, in one or more embodiments, the device (e.g., mobile phone) including the tag reader configured to read near-field communication tag 104 may be NFC enabled. The aforementioned standard(s) defined by the NFC forum are publicly available, and details associated therewith have been skipped merely for the sake of brevity and readability.

In one example embodiment, memory 202 may have a size of 96 bytes, 48 bytes, 2 kilobytes or 32 kilobytes, and the communication speed of near-field communication tag 104 may be 106 kilobits/second, 212 kilobits/second or 424 kilobits/second.

In one or more embodiments, near-field communication tag 104 may be relatively inexpensive to facilitate suitability of wearable apparel garment 100 to be sold therewith. For example, near-field communication tag 104 may cost a fraction of the cost associated with wearable apparel garment 100. In one or more embodiments, message communication area 104 may also be removably coupled to the externally visible area of textile region 102, as discussed above.

Figure 3:
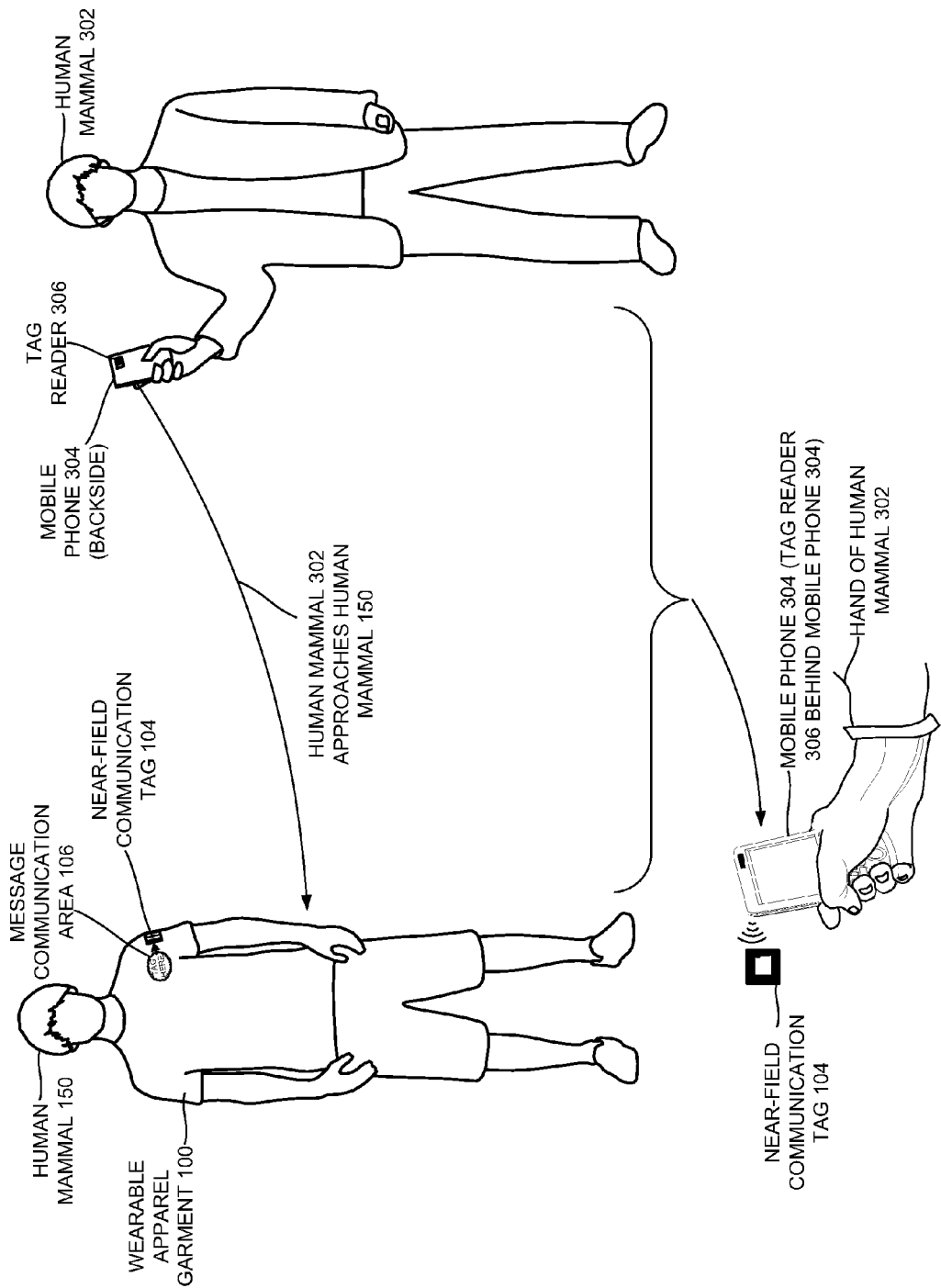
FIG. 3 is a schematic view of communication between another human mammal having a mobile phone associated therewith and the human mammal of FIG. 1, according to one or more embodiments.

In one or more embodiments, the responsive action of the another human mammal discussed above may be for the purpose of establishing a communication link between the tag reader associated with the another human mammal (e.g., a human being having a mobile phone including the tag reader) and near-field communication tag 104. FIG. 3 shows communication between the another human mammal (e.g., human mammal 302) having a mobile phone 304 associated therewith and human mammal 150 having epidermis region 152 associated therewith covered by wearable apparel garment 100 including near-field communication tag 104, according to one or more embodiments.

In one or more embodiments, mobile phone 304 may include tag reader 306 provided thereon. Thus, in one or more embodiments, human mammal 302 may "tag" (or, "touch") human mammal 150 by moving mobile phone 304 close to near-field communication tag 104 such that near-field communication tag 104 is within the "near-field" of tag reader 306, near-field communication tag 104 being coupled to wearable apparel garment 100 associated with human mammal 150. In one or more embodiments, the aforementioned "tagging" may occur in a social setting, which may lead to several interesting scenarios discussed below.

In one or more embodiments, tag reader 306 may be an active device configured to generate radio signal(s) to communicate with near-field communication tag 104. In one or more embodiments, as near-field communication tag 104 is preferably passive, near-field communication tag 104 may be powered through tag reader 306. Although a wireless transceiver may also be utilized instead of near-field communication tag 104, near-field communication tag 104 is preferred due to the "limits" imposed by the "near-field," the compactness thereof and the low cost associated therewith.

Thus, in one or more embodiments, the responsive action of human mammal 302 may be for the purpose of establishing a communication link between tag reader 306 and near-field communication tag 104 associated with human mammal 150. For example, near-field communication tag 104 may be configured to transmit a profile information of human mammal 150 to tag reader 306 following the establishment of the communication link. Upon transmission of the profile information to tag reader 306, a browser (e.g., a web browser) on which the profile information is displayed may be opened on tag reader 306. Management of information from near-field communication tag 104 associated with a number of human mammals (e.g., human mammal 150) may then be performed at a server, as will be discussed below.

Figure 4:
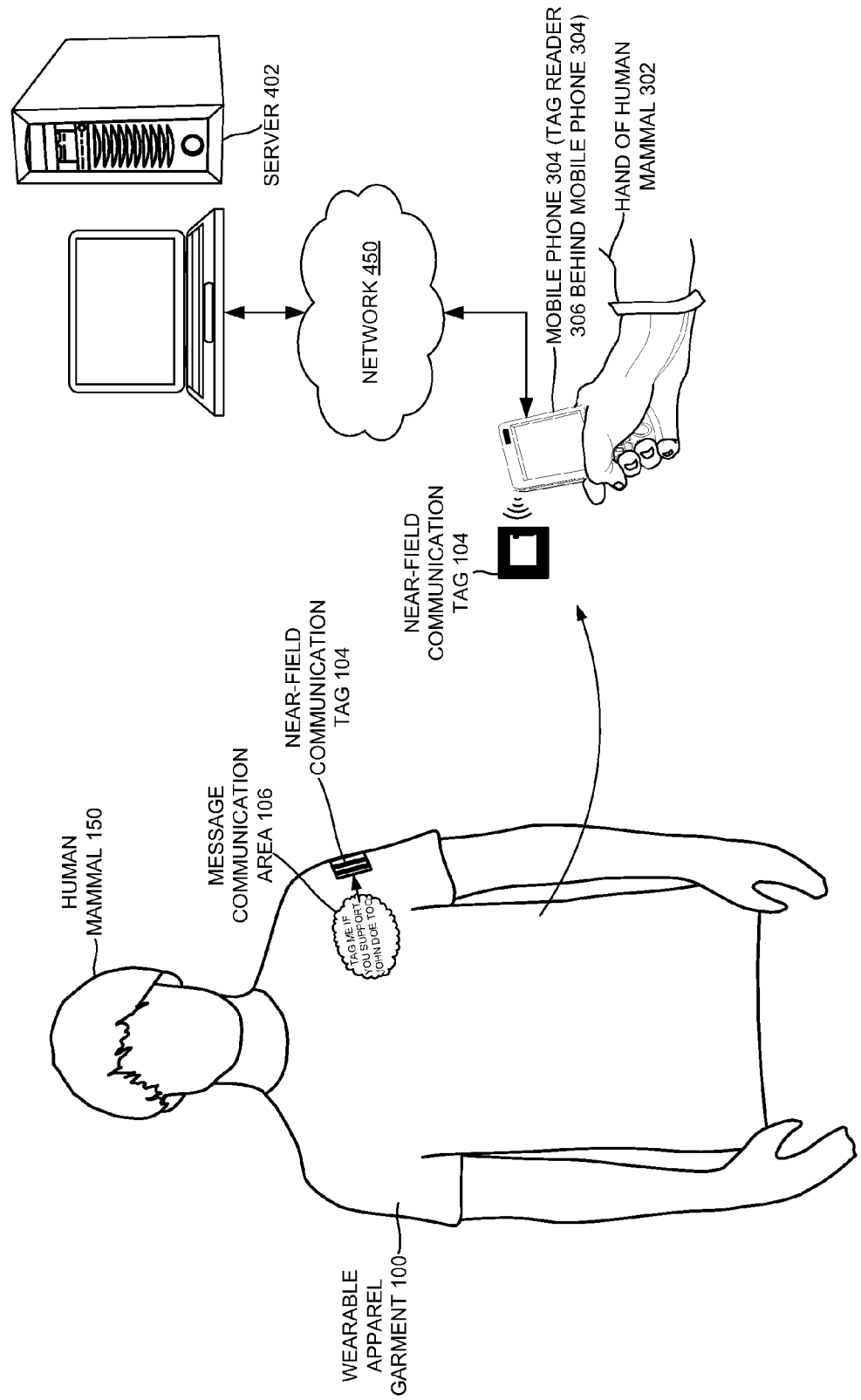
FIG. 4 is a schematic view of an example political campaign scenario involving the mobile phone of FIG. 3 and the near-field communication tag of FIG. 1.

FIG. 4 shows the device (e.g., mobile phone 304) including tag reader 306 as being wirelessly coupled to a server 402, according to one or more embodiments. In the example embodiment of FIG. 4, wearable apparel garment 100 may be sold as part of a political campaign. A number (e.g., >1000) of wearable apparel garments 100 may be sold to supporters of a political party and/or a candidate. A supporter may wear wearable apparel garment 100 on an occasion of a political campaign, where near-field communication tag 104 associated therewith may be "tagged" (or, "touched") by fellow supporters and/or campaign volunteers with appropriate tag reader(s) 306 (e.g., provided on mobile phone(s) associated therewith). Moreover, the supporter may attend other campaign events (e.g., at different locations) and/or other non-campaign political events, where he/she again sports wearable apparel garment 100.

The information about the number of times a supporter sporting wearable apparel garment 100 is "tagged" (e.g., at the same event, at different events) may be collected through server 402 (e.g., a computing system), which is configured to maintain the "tag" statistics in a profile information of the supporter (e.g., through a URL associated with the supporter). Based on the number of "tags," the biggest supporter(s) of the political party and/or the candidate may be identified.

In a heterogeneous gathering including supporters of multiple political parties, message communication area 106 may read, for example, "Tag me if you support John Doe too" (John Doe being a representative of a political party XYZ), as shown in FIG. 4, or, "Tag me if you support the XYZ party too," thereby serving as an invitation to fellow supporters to network (and/or socialize) through the "tagging" (or, "touching") process.

The aforementioned wearable apparel garment 100 may be sold (or, given away) at an event (e.g., a political event), and the purchaser-supporter may register his/her details with the seller. Each wearable apparent garment 100 sold may have a unique identifier associated therewith that is pre-programmed onto near-field communication tag 104. Alternately, near-field communication tag 104 may have a unique identifier associated therewith that is pre-programmed therein during manufacturing. The aforementioned unique identifier may also serve to identify the purchaser-supporter through wearable apparel garment 100 associated therewith. The unique identifier may be utilized to determine the biggest supporters of a political party and/or a candidate based on the number of "tags" associated therewith.

In another example scenario, the seller having tag reader 306 may "tag" (or, "touch") wearable apparel garment 100 of the purchaser-supporter upon the sale thereof. The "tagging" may initiate an information acquiring process on the device (e.g., mobile phone 304) including tag reader 306. Alternately, the purchaser-supporter may obtain a URL from the seller or read the URL from near-field communication tag 104 through a device (e.g., a personal mobile phone) including an appropriate tag reader. The purchaser-supporter may then open a browser and go to the webpage associated with the URL to register details thereof. Alternately, the browser and the webpage opening process may be automated through an appropriate agent (e.g., software agent) executing on the device (e.g., mobile phone) including the appropriate tag reader.

Figure 5:
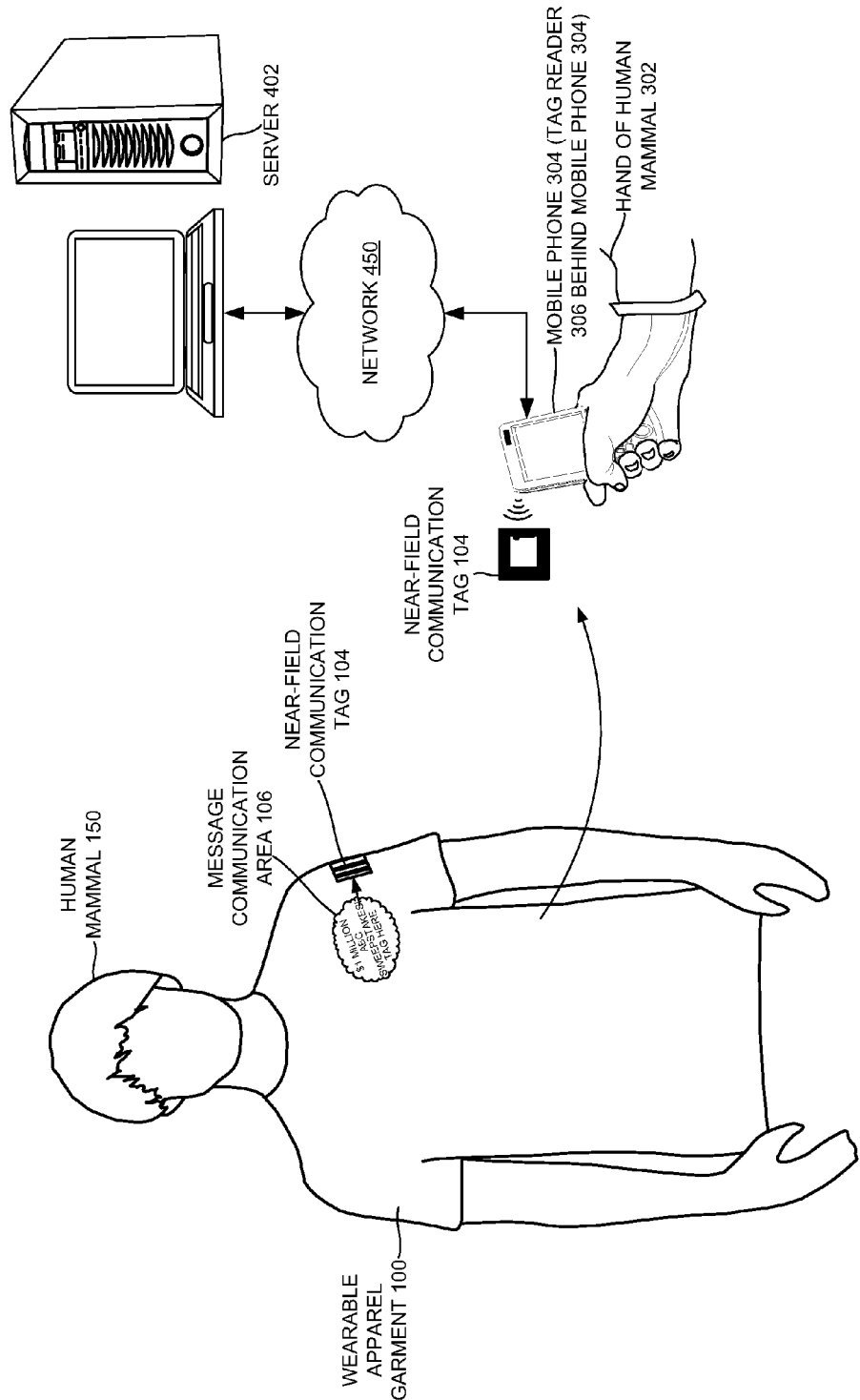
FIG. 5 is a schematic view of the near-field communication tag of FIG. 1 in an example sweepstakes scenario.

FIG. 5 shows near-field communication tag 104, tag reader 306 and server 402 in an example sweepstakes scenario. Here, "tagging" may be encouraged through enticing wearers of wearable apparel garment 100 into drawing(s) of chance (e.g., sweepstakes, raffles). For example, message communication area 106 may read "$1 million ABC sweepstakes! Tag here," thereby inviting potential strangers to communicate with human mammal 150 sporting wearable apparel garment 100. ABC, here, may be an organization associated with the sweepstakes.

Tagging associated with purchaser(s) of wearable apparel garments 100 with near-field communication tags 104 may be analyzed at server 402 to determine the highest "tagged" purchaser, who may be chosen to receive one or more reward(s) associated with the sweepstakes. Alternately, the device (e.g., mobile phone 304) including tag reader 306 that tagged the most number of purchaser(s) may also receive one or more reward(s) associated with the sweepstakes. The entity/organization selling (or, giving away) wearable apparel garments 100 may be the same entity/organization associated with the sweepstakes. Alternately, the entity/organization selling (or, giving away) wearable apparel garments 100 may be different from the entity/organization associated with the sweepstakes. The entity/organization associated with the sweepstakes may have tied up with the entity/organization selling (or, giving away) wearable apparel garments 100 for promotional/collaborative purposes.

The abovementioned drawing(s) of chance may also be localized to, for example, a party, where human mammal 150 "tagged" the most wins a prize. Alternately, the "tagging" may also be part of a game involving finding a "hidden tag" through the process. For example, a particular unique identifier of near-field communication tag 104 may trigger a response associated with winning the game through the "tagging," while other unique identifier(s) may not trigger the aforementioned response.

Also, human mammal 150 associated with near-field communication tag 104 may have message communication area 106 indicating "Tag here to enter $1 million sweepstakes" or the ilk to enable another human mammal (e.g., human mammal 302) having a device (e.g., a mobile phone) including tag reader 306 enter into the sweepstakes. Here, human mammal 150 may be associated with the entity/organization associated with the sweepstakes. Alternately, human mammal 150 may be associated with another entity/organization collaborating with the entity/organization associated with the sweepstakes for promotional/collaboration purposes. Other "gaming" applications enabled through wearable apparel garment 100 are within the scope of the exemplary embodiments.

Figure 6:
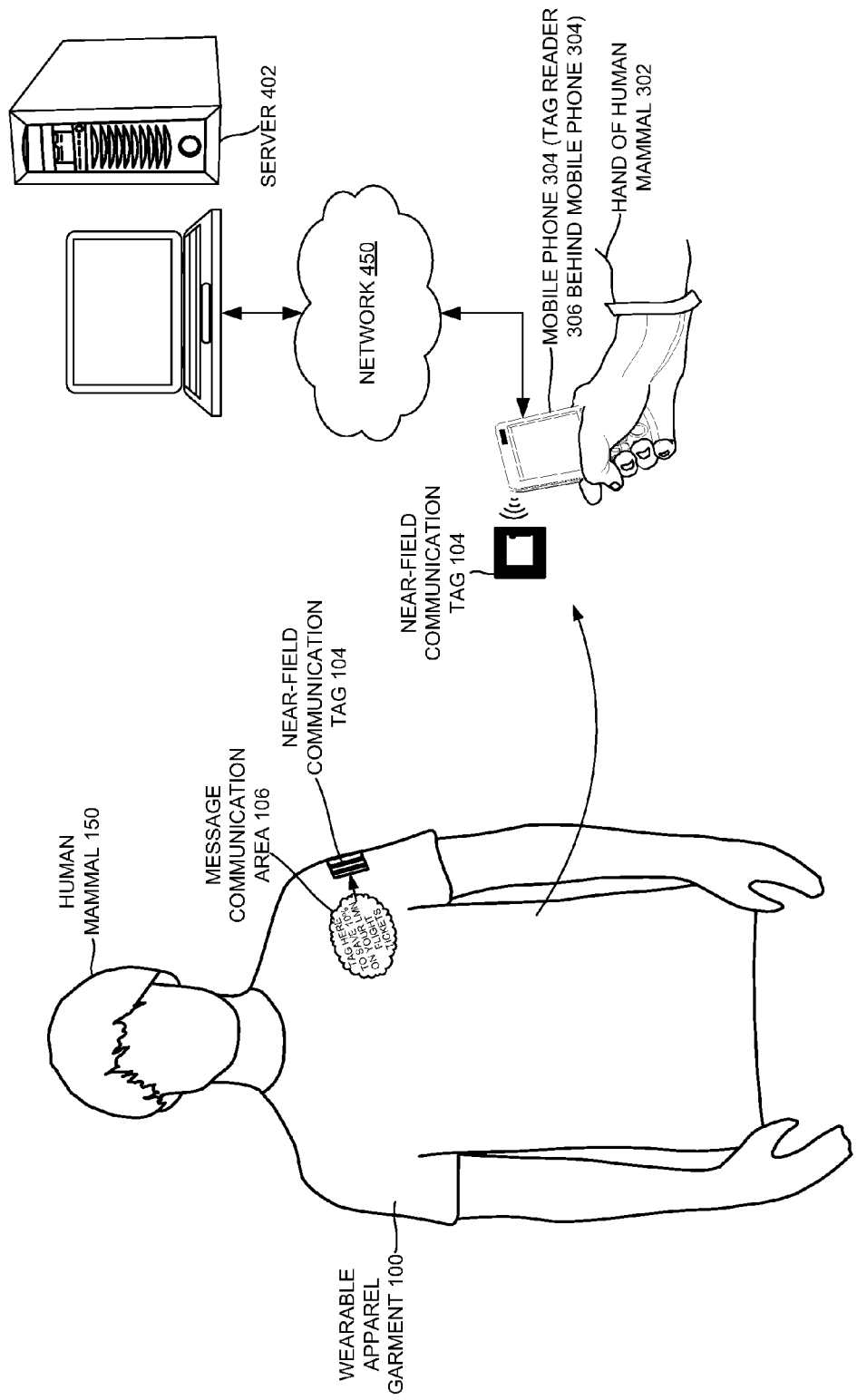
FIG. 6 is a schematic view of the near-field communication tag of FIG. 1 in an example coupon distribution application.

FIG. 6 shows near-field communication tag 104, tag reader 306 and server 402 in an example coupon distribution application. As an example, message communication area 106 indicates "Tag here to save 10% on your LMN flight tickets," as shown in FIG. 6. Here, a representative (e.g., human mammal 150) of the LMN flight company or a company/organization authorized to provide the 10% discount may sport wearable apparel garment 100 including near-field communication tag 104. Another human mammal (e.g., human mammal 302) may "tag" the representative, following which a 10% discount coupon is transmitted to the device (e.g., mobile phone 304) of human mammal 302 including tag reader 306. The coupon transmission process may include operations such as requesting the another human mammal (e.g., human mammal 302) for appropriate contact details (e.g., e-mail address, phone number, residential address) and transmitting the discount coupon based on the appropriate contact details (e.g., e-mail address, phone number, residential address). The 10% discount coupon may be immediately transmitted (e.g., based on e-mail, phone number (e.g., through text message)) to the another human mammal and/or transmitted at a later time (e.g., by post, e-mail). The another human mammal (e.g., human mammal 302) may then avail the 10% discount on ticket(s) on planes associated with the LMN company. Other "coupon distribution" applications, again, are within the scope of the exemplary embodiments.

The role of server 402 in the example embodiment of FIG. 6 may be to validate (e.g., during transmission, during booking of ticket(s)) the 10% discount coupon transmitted to the another human mammal (e.g., human mammal 302). Server 402 (e.g., may be associated with an entity (e.g., a company) associated with human mammal 150) may also be configured to deliver an incentive to the representative/wearer of wearable apparel garment 100 (e.g., human mammal 150) based on, for example, a number of discount coupons transmitted therefrom and/or a number of "tags" of near-field communication tag 104. One or more scenarios discussed below may also involve incentivizing human mammal 150. For example, in a drawing of chance, a person associated with near-field communication tag 104 may have an incentive transmitted thereto when tagged (e.g., based on a unique identifier associated with near-field communication tag 104).

Figure 7:
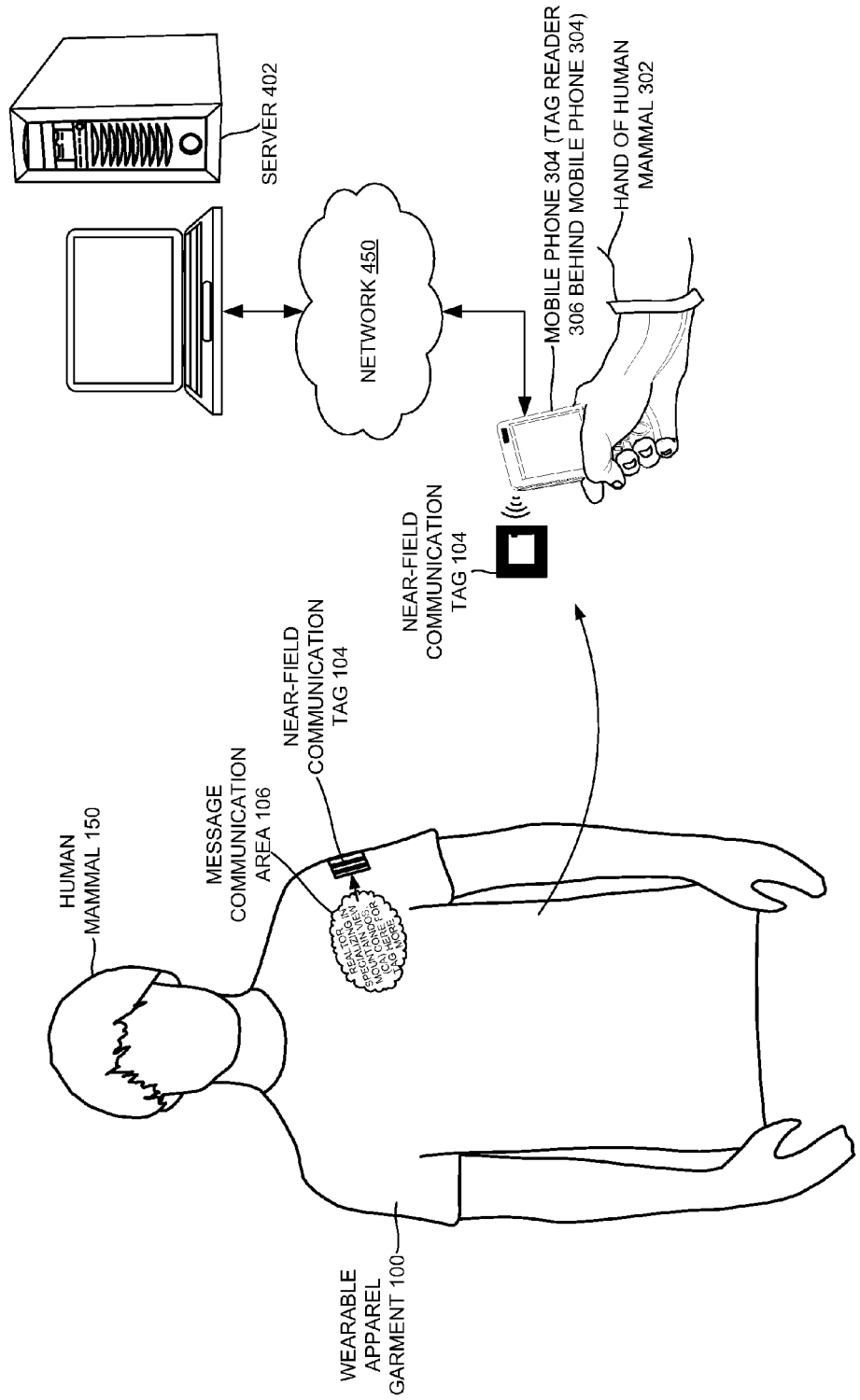
FIG. 7 is a schematic view of the near-field communication tag of FIG. 1 in an example professional service provider application.

FIG. 7 shows near-field communication tag 104, tag reader 306 and server 402 in an example professional service provider application. Here, human mammal 150 sporting wearable apparel garment 100 including near-field communication tag 104 may be a real estate agent (or, realtor), and message communication area 106 may indicate, as an example, "Realtor specializing in Mountain View (CA) condos. Tag here for more." Now, when the another human mammal (e.g., human mammal 302) "tags" the real estate agent through a device (e.g., a personal mobile phone 304) including tag reader 306, contact information of the real estate agent may be transmitted to the another human mammal (e.g., human mammal 302). Alternately, a URL to download a brochure (e.g., resident on server 402) associated with the real estate agent may be transmitted to the another human mammal (e.g., human mammal 302). Other "professional service" applications are within the scope of the exemplary embodiments.

Figure 8:
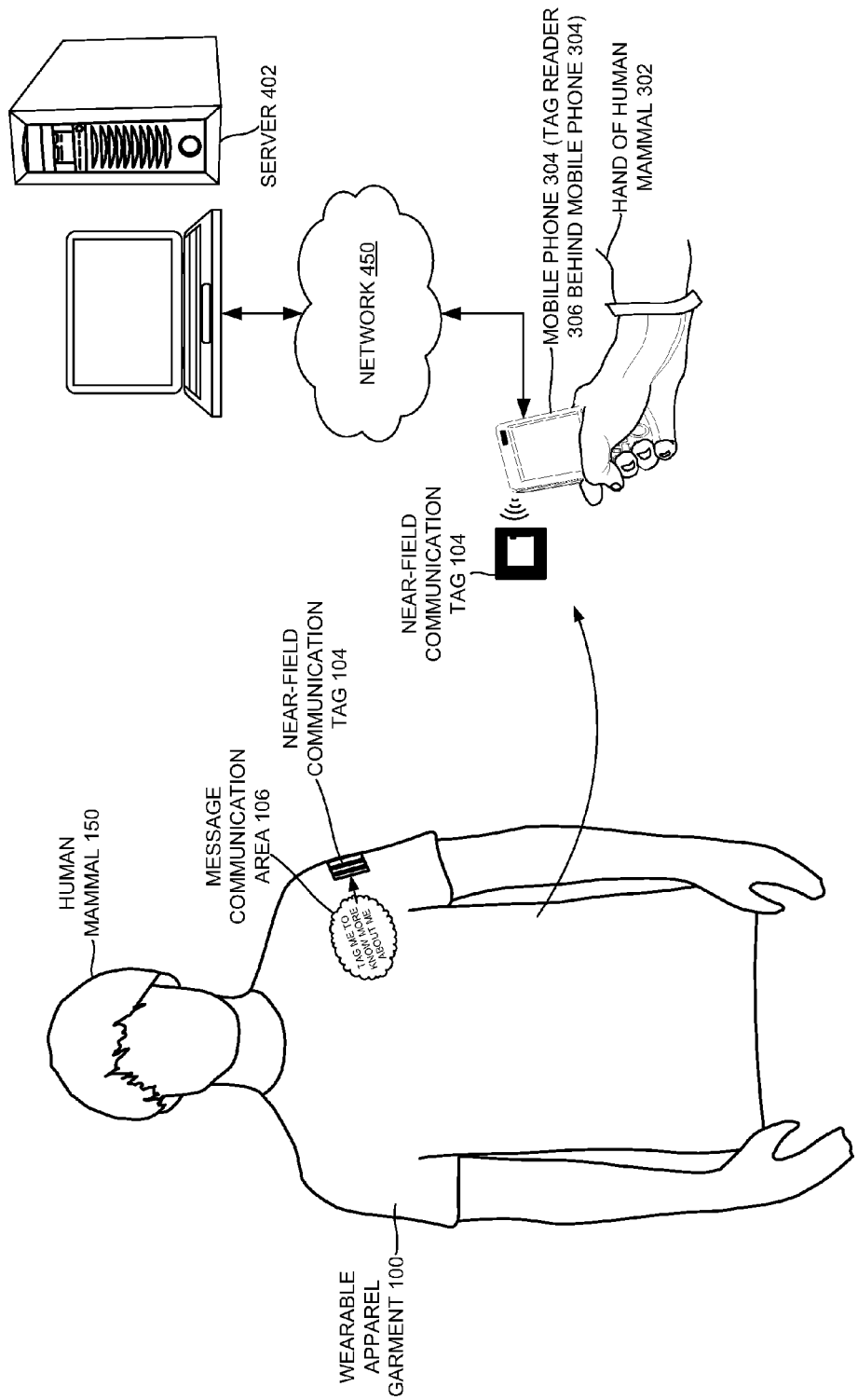
FIG. 8 is a schematic view of the near-field communication tag of FIG. 1 in an example dating application.

FIG. 8 shows near-field communication tag 104, tag reader 306 and server 402 in an example dating application. While at a social gathering (e.g., at a mixer), human mammal 150 may sport wearable apparel garment 100 including near-field communication tag 104, with message communication area 106 indicating "Tag me to know more about me" (or, "Tag me to see my personal page," or, "Tag me to see my dating profile," or, "Tag me to see my social networking profile"). Another human mammal (e.g., human mammal 302) may possess a device (e.g., a mobile phone 304) including tag reader 306. The another human mammal (e.g., human mammal 302) may "tag" human mammal 150 to establish contact therebetween. For example, human mammal 302 may obtain a URL of a personal page, dating profile and/or a social networking profile (e.g., Facebook profile) of human mammal 150 by way of "tagging" near-field communication tag 104 associated with human mammal 150.

The aforementioned "tagging" capability through wearable apparel garment 100 may allow for shy human mammals to establish communication with fellow human mammals, and to break out of the "shyness." Also, when human mammal 150 is "tagged" by human mammal 302, human mammal 150 may be able to see human mammal 302, thereby allowing for establishment of eye contact prior to a post-"tag" follow-up. Server 402, here, may be configured to host the personal page, dating profile and/or the social networking profile associated with human mammal 302 and/or human mammal 150.

Figure 9:
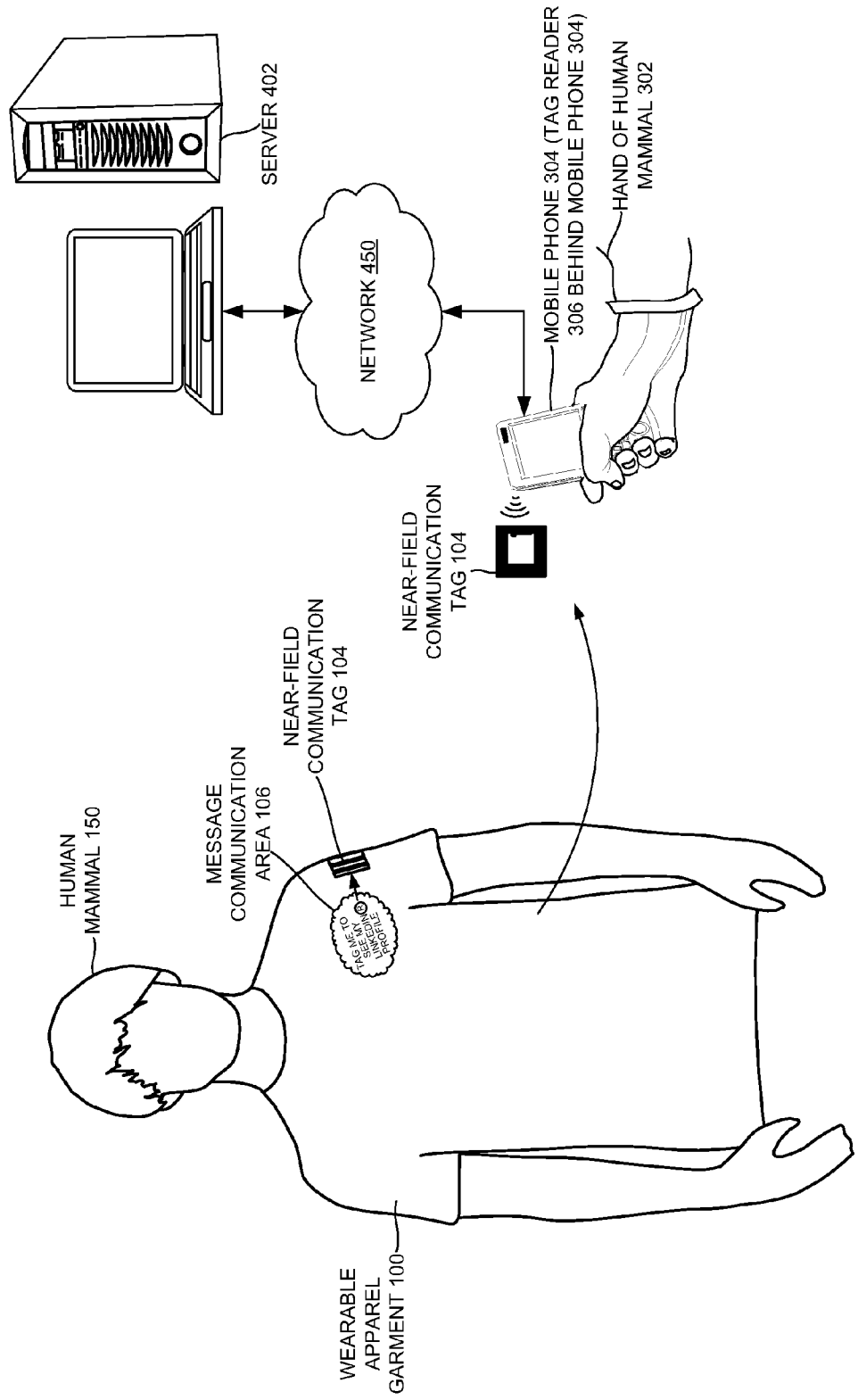
FIG. 9 is a schematic view of the near-field communication tag of FIG. 1 in an example social networking scenario.

FIG. 9 shows near-field communication tag 104, tag reader 306 and server 402 in an example social networking scenario. For example, human mammal 150 sporting wearable apparel garment 100 may indicate "Tag me to see my LinkedIn® profile" through message communication area 106, as shown in FIG. 9. Another human mammal 302 may receive a URL of the LinkedIn® profile of human mammal 150 following the "tagging" (e.g., by "touching" near-field communication tag 104 of wearable apparel garment 100) through tag reader 306 included in a device (e.g., a mobile phone 304) associated therewith. The aforementioned "tagging" may occur during a business networking event, a social networking event and/or other forms of mixers.

Alternately, upon the "tagging" of human mammal 150 by the another human mammal 302, a web browser may be opened in the device (e.g., mobile phone 304) of the another mammal 302 and the LinkedIn® profile webpage associated with the URL transmitted to the device may be opened. The another human mammal 302 may then subsequently complete the LinkedIn® connection process. Also, the process of sending a LinkedIn® connection request may be automated through the device and/or near-field communication tag 104. The physical presence of human mammal 150 may lend a personal touch to the social/business networking process.

It is obvious that the networking discussed above is not limited to LinkedIn® but may also include other forms of social/business networking. In the LinkedIn® example discussed above, human mammal 150 may program near-field communication tag 104 to store the LinkedIn® URL associated therewith during, for example, registration with the entity/organization associated with selling (or, giving away)/promoting wearable-apparel garment 100.

In all of the abovementioned scenarios, the device (e.g., mobile phone 304) including card reader 306 may be coupled (e.g., wirelessly) to server 402 through a network 450 (e.g., Internet), as shown in FIGS. 4-9. To generalize example embodiments associated with FIGS. 4-9, message communication area 106 may be utilized to describe (e.g., "Tag me to obtain 10% discount on food") an incentive to human mammal 302. The incentive may be delivered to the device (e.g., mobile phone 304) upon the "reading" of near-field communication tag 104 through a browser that activates (or, loads) a webpage associated with the URL transmitted to the device from near-field communication tag 104. The incentive may be a coupon having a monetary value associated therewith and/or an entry into drawing(s) of chance involving one or more prize(s).

Figure 10:
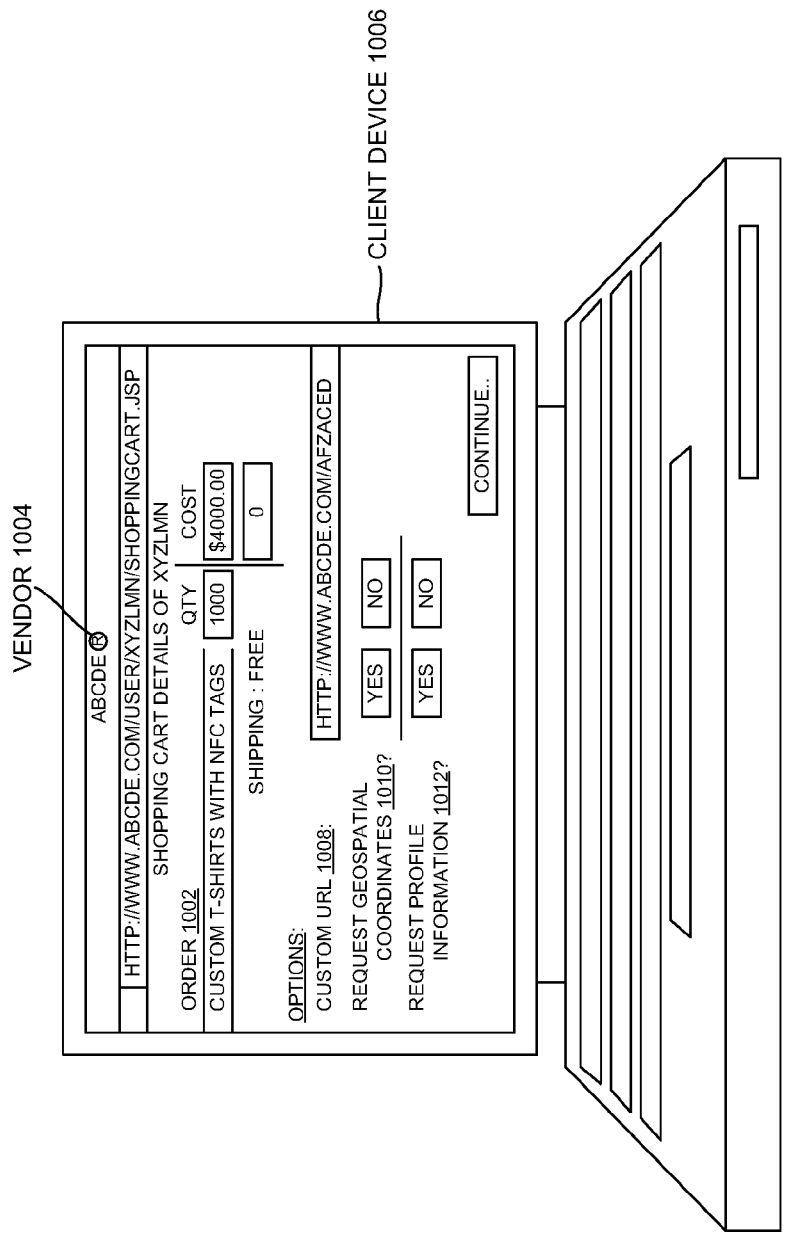
FIG. 10 is a schematic view of an example scenario of custom programming the near-field communication tag during ordering of the wearable apparel garment of FIG. 1.

FIG. 10 shows an example scenario of custom programming near-field communication tag(s) 104 during ordering of wearable apparel garment(s) 100. In one or more embodiments, an entity (e.g., individual, organization) may place a bulk order (e.g., for 1000 shirts or more) for wearable apparel garment(s) 100 through, for example, the Internet (e.g., through custom-design websites such as Zazzle® and Cafepress®). During an example scenario of checkout associated with an order 1002 (e.g., order for 1000 shirts in FIG. 10) through a vendor 1004 (e.g., Zazzle®; abcde® as shown in FIG. 10) on a client device 1006, the entity may indicate the URL (e.g., custom URL 1008 shown in FIG. 10) to be programmed (and stored) into near-field communication tag 104, which is configured to be transmitted to the device (e.g., mobile phone) including tag reader 306 when "read" therefrom. Near-field communication tag 104 may be sold along with wearable apparel garment 100. Other options such as requesting for geospatial coordinates 1010 of the device (e.g., mobile phone 304) and/or profile information 1012 thereof when near-field communication tag 104 is "tagged" by the device may also be provided.

In one or more embodiments, a representative of the entity (e.g., entity representative 1208) may be provided the abovementioned options through a user interface (e.g., placing the order through client device 1006 or a mobile phone) associated with a website of vendor 1004.

The abovementioned near-field communication tag 104 may be procured by vendor 1004 from another third-party vendor. In one or more embodiments, near-field communication tag 104 may be programmed with a unique identifier, and when wearable apparel garment 100 is "tagged" by a device (e.g., a mobile phone; based on reading the unique identifier) including tag reader 306, near-field communication tag 104 may be configured to transmit the abovementioned URL to the device. Alternately, in one or more embodiments, unique identification data associated with near-field communication tag 104 may be transmitted to the device, following which a human mammal (e.g., human mammal 302) associated with the device may log into an appropriate webpage associated with vendor 1004 and obtain the profile page of the human mammal (e.g., human mammal 150) associated with wearable apparel garment 100. Other implementations are within the scope of the exemplary embodiments.

For example, the "reading"/"tagging" of near-field communication tag 104 by a mobile phone including tag reader 306 may transmit an appropriate request for geospatial coordinates of human mammal 302 associated with the mobile phone. If human mammal 302 accedes to the request (e.g., through a user prompt on the mobile phone), his/her geospatial coordinates may be transmitted to a server (e.g., server 402) configured to process data associated with buyers/possessors of wearable apparel garment(s) 100.

Figure 11:
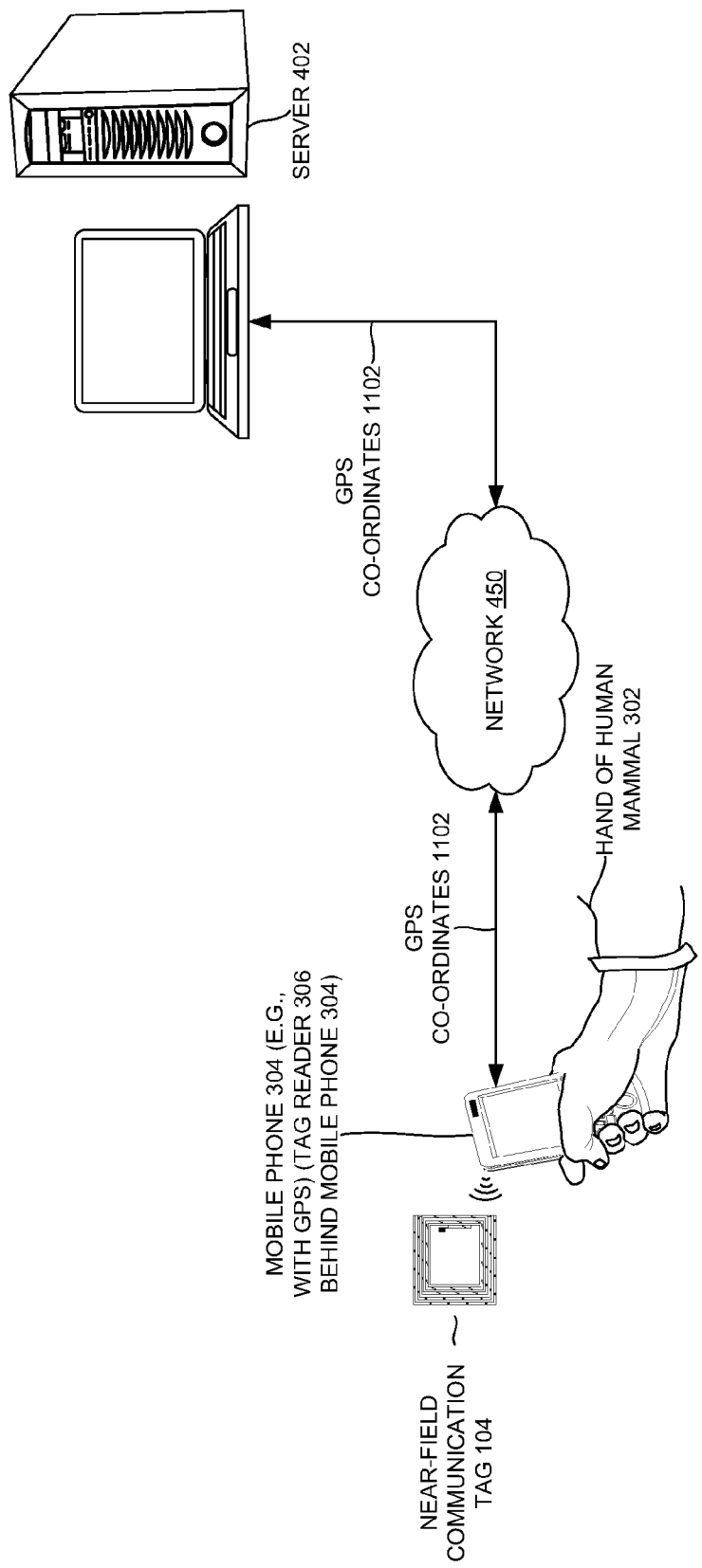
FIG. 11 is a schematic view of an example scenario of enabling transmission of geospatial coordinates through the wearable apparel garment of FIG. 1.

FIG. 11 shows an example scenario of enabling transmission of geospatial coordinates through wearable apparel garment 100. In one or more embodiments, human mammal 302 having mobile phone 304 may be configured to "tag" human mammal 150 sporting wearable apparel garment 100, following which a request for geospatial coordinates from mobile phone 304 is generated (e.g., through near-field communication tag 104). In the scenario of FIG. 10, the entity may indicate as to whether geospatial coordinates and/or profiles of mobile phones (e.g., mobile phone 304) are to be requested following "reading" of near-field communication tag 104 of wearable apparel garment 100.

In one or more embodiments, human mammal 302 may accede to the request (e.g., through a user prompt generated on mobile device 304; alternately, human mammal 302 may decline the request), following which geospatial coordinates 1102 from mobile device 304 may be transmitted to server 402. Again, server 402 may be coupled to mobile phone 304 through network 450.

The aforementioned transmission of geospatial coordinates (e.g. through a Global Positioning System (GPS) enabled mobile phone 304) to server 402 may allow for vendor(s) and/or the purchasing entity of FIG. 10 to determine location(s) at which wearable apparel garment(s) 100 are being "tagged," thereby aiding in the identification of potential customers, potential clients, prospective customer location(s), prospective client location(s), location(s) to target for business etc. In other words, the transmission of geospatial coordinates may aid in the application of "market intelligence."

Figure 12:
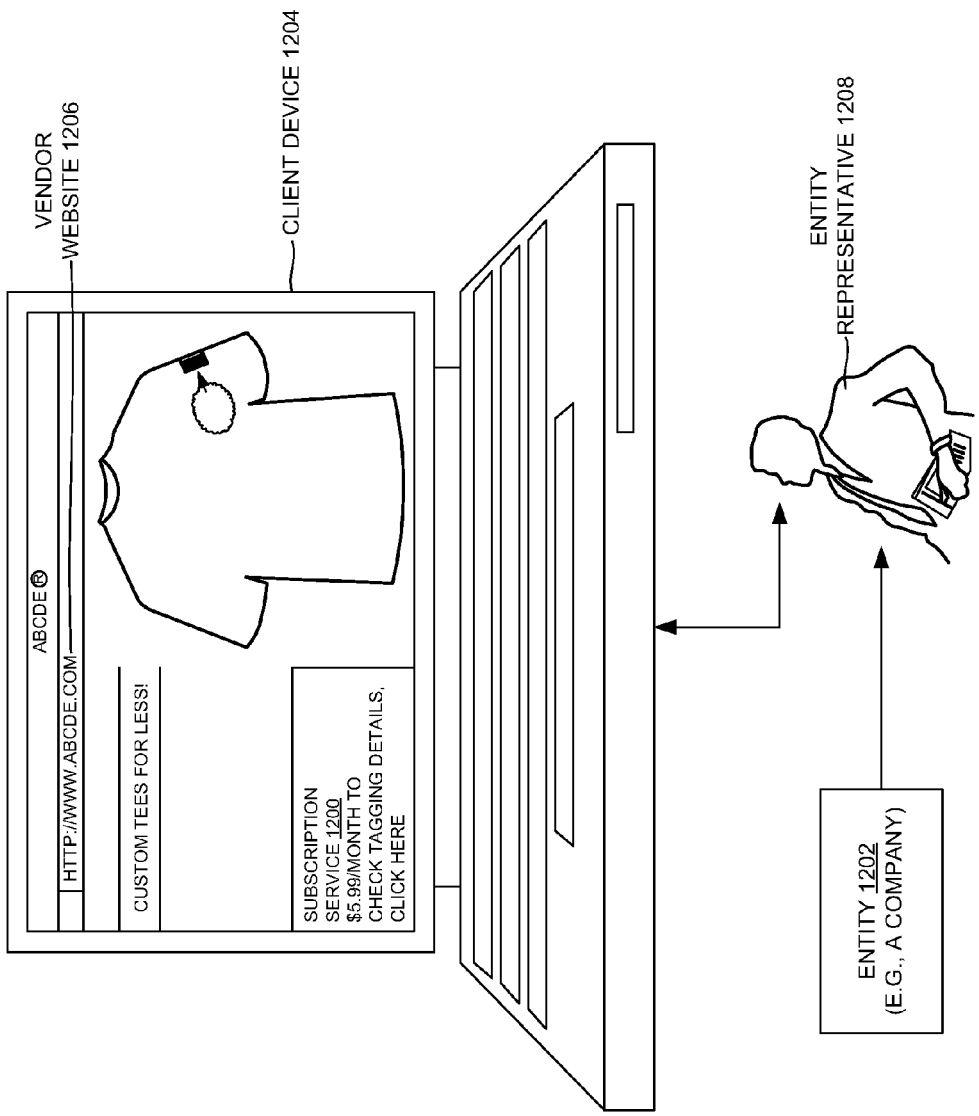
FIG. 12 is a schematic view of provision of a subscription service to an entity to aid in the application of market intelligence, according to one or more embodiments.

FIG. 12 shows a subscription service 1200 provided to an entity 1202 to aid in the application of the abovementioned market intelligence, according to one or more embodiments.

Entity 1202 (e.g., the purchasing entity of FIG. 10) may subscribe to subscription service 1200 through a client device 1204 (e.g., an entity representative 1208 may subscribe on behalf of entity 1202) associated therewith by loading a vendor website 1206 on a browser thereon. For example, the vendor may provide subscription service 1200 to entity 1202, and may charge a fee (e.g., an annual fee) for the same.

Figure 13:
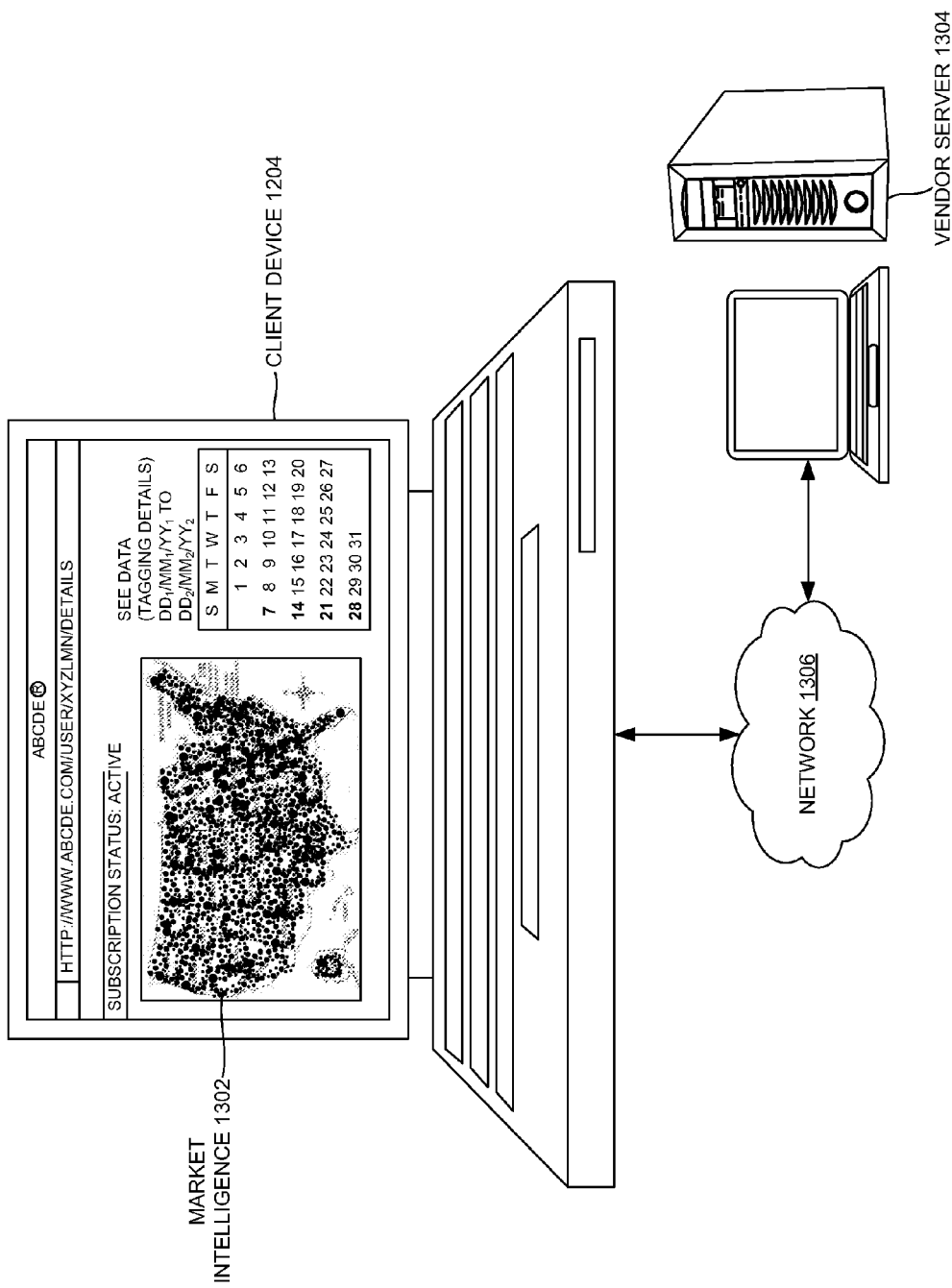
FIG. 13 is a schematic view of market intelligence being provided through the subscription service of FIG. 12, according to one or more embodiments.

Entity 1202, through subscription service 1200, may have a profile associated therewith created on vendor website 1206 based on the purchase of wearable apparel garment(s) 100 and/or the purchase of subscription service 1200. FIG. 13 shows market intelligence 1302 being provided through subscription service 1200, according to one or more embodiments. In the example embodiment of FIG. 13, entity 1202 may log into an account thereof on client device 1204 to obtain details associated with "tagging" of wearable apparel garment(s) 100 (e.g., geospatial coordinate details of mobile phone(s) tagging wearable apparel garment(s) 100, profile details of mobile phone(s), map showing the locations where wearable apparel garment(s) 100 were tagged based on the geospatial coordinate details of the mobile phone(s)). As the aforementioned details of "tagging" may be resident on vendor server 1304 (e.g., server 402), the aforementioned details may be accessed through client device 1204 and/or transmitted to client device 1204 from vendor server 1304 (e.g., by e-mail). Obviously, client device 1204 may be coupled to vendor server 1304 through a network 1306 (e.g., Internet).

Although an example subscription service 1200 with fees is discussed above, it is obvious that the aforementioned service may be provided free of cost. Also, only human mammal(s) 302 acceding to the request(s) for geospatial coordinates, for example, may have data associated therewith revealed to entity 1202 through client device 1204 (e.g., a computing system, a mobile phone).

Figure 14:
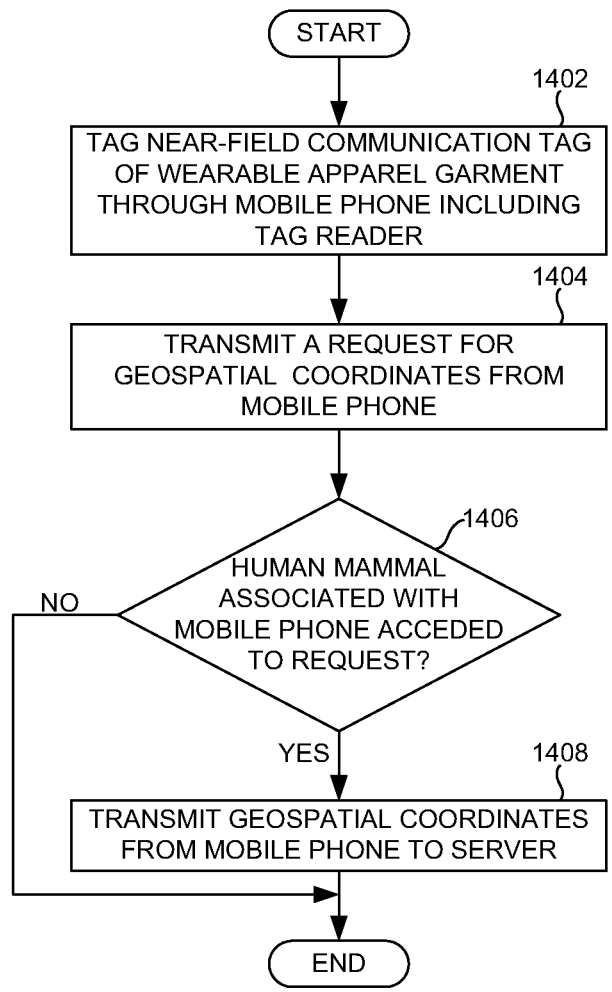
FIG. 14 is a flowchart detailing the operations involved in obtaining geospatial coordinates of the mobile phone of FIG. 3, according to one or more embodiments.

FIG. 14 shows a flowchart detailing the operations involved in obtaining geospatial coordinates of mobile phone 304 associated with human mammal 302, according to one or more embodiments. In one or more embodiments, operation 1402 may involve "tagging" near-field communication tag 104 of wearable apparel garment 100 through mobile phone 304 including tag reader 306. In one or more embodiments, operation 404 may involve transmitting a request for geospatial coordinates from mobile phone 304 (e.g., through near-field communication tag 104). In one or more embodiments, operation 1404 may involve checking as to whether human mammal 302 has acceded to the request. If yes, in one or more embodiments, operation 1406 may involve transmitting the geospatial coordinates from mobile phone 304 to server 402.

In one or more embodiments, as discussed above, the application of "market intelligence" may be enabled through the "tagging" details (e.g., geospatial information, profile information) of human mammal(s) 150 sporting wearable apparel garment(s) 100. In one or more embodiments, businesses/self-employed human mammal(s) may benefit from concrete data collected through the "tagging" to structure pre-existing business goal(s) and/or target new goal(s). It is obvious that entity 1202 may promote a business thereof through the purchase of wearable apparel garment(s) 100 from an appropriate vendor.

In one or more embodiments, near-field communication tag 104 may be programmable by human mammal 150 possessing wearable apparel garment 100. Additionally, in one or more embodiments, near-field communication tag(s) 104 associated with a number of wearable apparel garment(s) 100 may be programmable simultaneously by a transferor thereof through a tag definition website.

It is obvious that human mammal 302 may deny the request from near-field communication tag 104 for profile data, geospatial coordinates, personal information etc. upon the "reading" thereof. Also, near-field communication tag 104 may be made readable alone for wearable apparel garment(s) 100 that are given away for free and programmable (read/write) for designer wearable apparel garment(s) 100. Further, the abovementioned collection of geospatial coordinates may enable creation of a localized social network circle. The indication associated with message communication area 106 may also be determined/chosen during purchase (e.g., through the Internet) of wearable apparel garment(s) 100. The possible application scenario(s) associated with wearable apparel garment(s) 100 are not limited to the scenario(s) discussed above.

Figure 15:
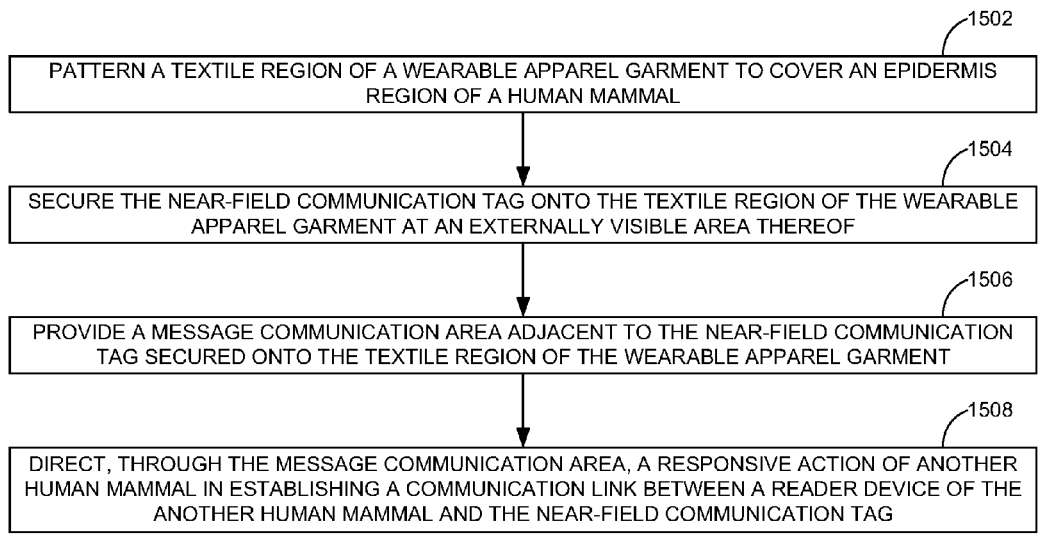
FIG. 15 is a process flow diagram detailing the operations involved in a method of establishing a communication link between human mammals, according to one or more embodiments.

FIG. 15 shows a process flow diagram detailing the operations involved in a method of establishing a communication link between human mammals, according to one or more embodiments. In one or more embodiments, operation 1502 may involve patterning textile region 102 of wearable apparel garment 100 to cover epidermis region 152 of human mammal 150. In one or more embodiments, operation 1504 may involve securing near-field communication tag 104 onto textile region 102 of wearable apparel garment 100 at an externally visible area thereof.

In one or more embodiments, operation 1506 may involve providing message communication area 106 adjacent to near-field communication tag 104 secured onto textile region 102 of wearable apparel garment 100. In one or more embodiments, operation 1508 may then involve directing, through message communication area 106, a responsive action of another human mammal (e.g., human mammal 302) in establishing a communication link between a reader device (e.g., mobile phone 304) of the another human mammal (e.g., human mammal 302) and near-field communication tag 104.

Figure 16:
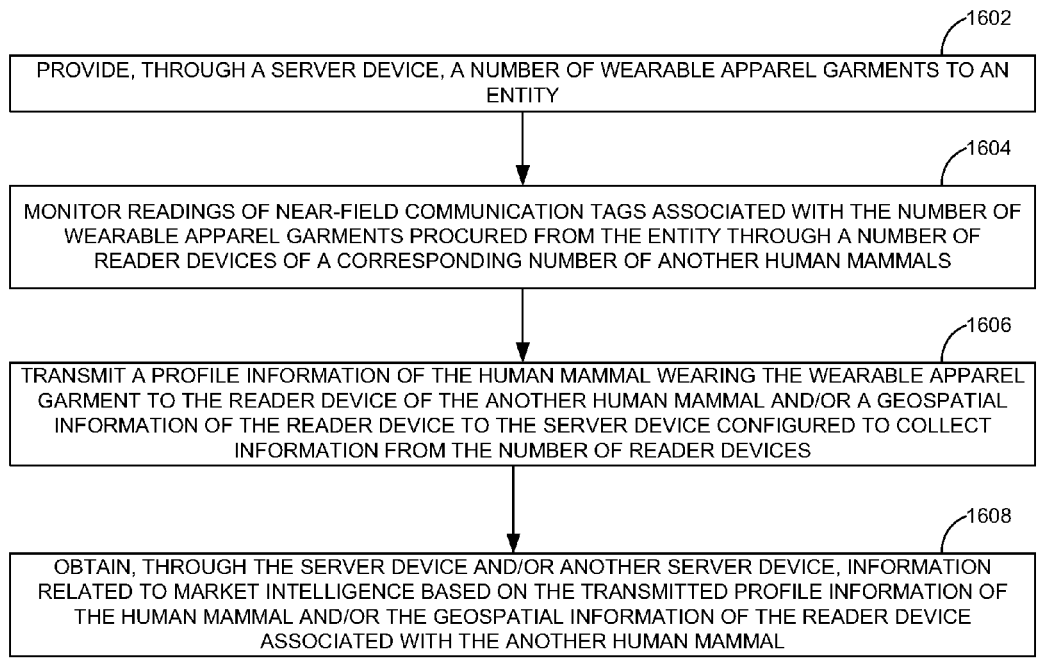
FIG. 16 is a process flow diagram detailing the operations involved in a method of obtaining information related to market intelligence, according to one or more embodiments.

FIG. 16 shows a process flow diagram detailing the operations involved in a method of obtaining information related to market intelligence, according to one or more embodiments. In one or more embodiments, operation 1602 may involve providing, through a server device (e.g., server 402), a number of wearable apparel garments 100 to an entity (e.g., entity 1202). In one or more embodiments, each wearable apparel garment 100 of the number of wearable apparel garments 100 may include textile region 102 configured to cover epidermis region 152 of human mammal 150, near-field communication tag 104 coupled to textile region 102 of wearable apparel garment 100 at an externally visible area thereof, and message communication area 106 adjacent to near-field communication tag 104 configured to direct a responsive action of another human mammal (e.g., human mammal 302) in establishing a communication link between a reader device (e.g., mobile phone 304) of the another human mammal (e.g., human mammal 302) and near-field communication tag 104.

In one or more embodiments, operation 1604 may include monitoring (e.g., during one or more social situation (s) such as a political campaign rally and a mixer), readings of near-field communication tags 104 associated with the number of wearable apparel garments 100 procured from the entity (e.g., entity 1202) through a number of reader devices (e.g., mobile phone 304) of a corresponding number of another mammals (e.g. human mammal 302). In one or more embodiments, operation 1606 may involve transmitting, through the communication link, a profile information of the human mammal wearing the wearable apparel garment to the reader device of the another human mammal and/or a geospatial information of the reader device to the server device configured to collect information from the number of reader devices.

In one or more embodiments, operation 1608 may then involve obtaining, through the server device (e.g., server device 402) and/or another server device, information related to market intelligence based on the transmitted profile information of the human mammal and/or the geospatial information of the reader device associated with the another human mammal.

Figure 17:
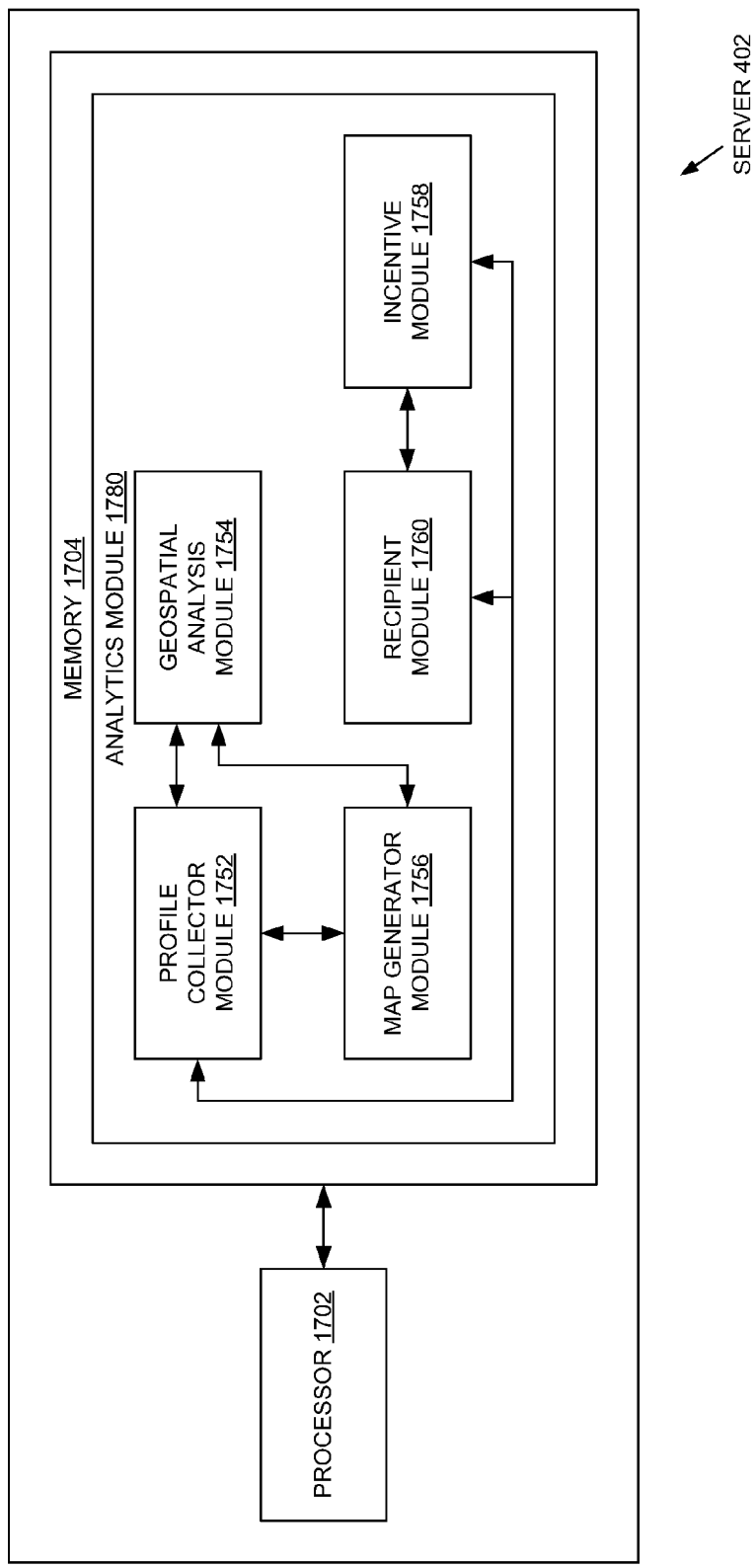
FIG. 17 is a schematic view of an example server utilized in the scenarios associated with one or more of FIGS. 4-13, according to one or more embodiments.

FIG. 17 shows an example server 402, according to one or more embodiments. In one or more embodiments, server 402 may include processor 1702 configured to execute instructions associated with one or more modules thereof. In one or more embodiments, server 404 may also include memory 1704 having locations configured to be addressable by processor 1702. In one or more embodiments, memory 1704 may also have instructions associated with the one or more modules (to be discussed below) stored therein. In one or more embodiments, memory 1704 may be distinct from processor 1702 or may be a part of processor 1702. The one or more modules are discussed below.

In one or more embodiments, profile collector module 1752 may have instructions relating to obtaining profile information of human mammal 302 and/or human mammal 150 associated therewith. For example, upon "tagging" of near-field communication tag 104 associated with wearable apparel garment 100 by mobile phone 304 of human mammal 302, the profile information associated with mobile phone 304 (or, human mammal 302) may be transmitted to server 402, where, specifically, profile collector module 1752 is configured to gather the aforementioned information. Obviously, as discussed above, the "tagging" may result in the request for the profile information of human mammal 302 (e.g., by way of prompting human mammal 302 through mobile phone 304), upon which human mammal 302 may accede thereto or decline the request.

In scenarios such as (but not limited to) incentivizing human mammal 150 for a number of "tags" associated with near-field communication tag 104 and/or identifying the "referrer" of human mammal 302 (e.g., because of the "tagging"), the profile information (e.g., unique identifier of near-field communication tag 104) associated with human mammal 150 may also be collected through profile collector module 1752 (e.g., through the "tags").

In one or more scenario(s) involving transmission of geospatial information (e.g., geospatial coordinates 1102) from mobile phone 304, profile collector module 1752 may again be configured to collect the aforementioned geospatial information. In one or more embodiments, geospatial analysis module 1754 may have instructions relating to analyzing the geospatial information associated therewith. For example, the analysis of the geospatial information may include but is not limited to converting the collected data into a proper format suitable for generation of a map (to be discussed) and matching geospatial information with appropriate profile(s) from the profile information.

In one or more embodiments, map generator module 1756 may have instructions relating to generating a map based on the analysis through geospatial analysis module 1754 associated therewith. In one or more embodiments, the map may include information associated with location(s) of tagging based on the geospatial information, location(s) of redemption of discount coupons transmitted through the tags, location(s) of purchase(s) of wearable apparel garment(s) 100 etc. In one or more embodiments, incentive module 1758 may have instructions relating to incentive information, incentive redemption, incentive(s) based on a number of "tags" etc. associated therewith. In one or more embodiments, recipient module 1760 may include instructions relating to a type of device (e.g., mobile phone 304) "tagging" near-field communication tag 104 associated therewith. Other variations are within the scope of the exemplary embodiments.

FIG. 17 shows all of the abovementioned modules being a part of an analytics module 1780. It is obvious that one or more modules included therein is merely for illustrative purpose(s) and that one or more modules more may be included in addition thereto. Alternately, one or more modules may not be required (e.g., analytics module 1780 may only be directed to geospatial analysis).

Figure 18:
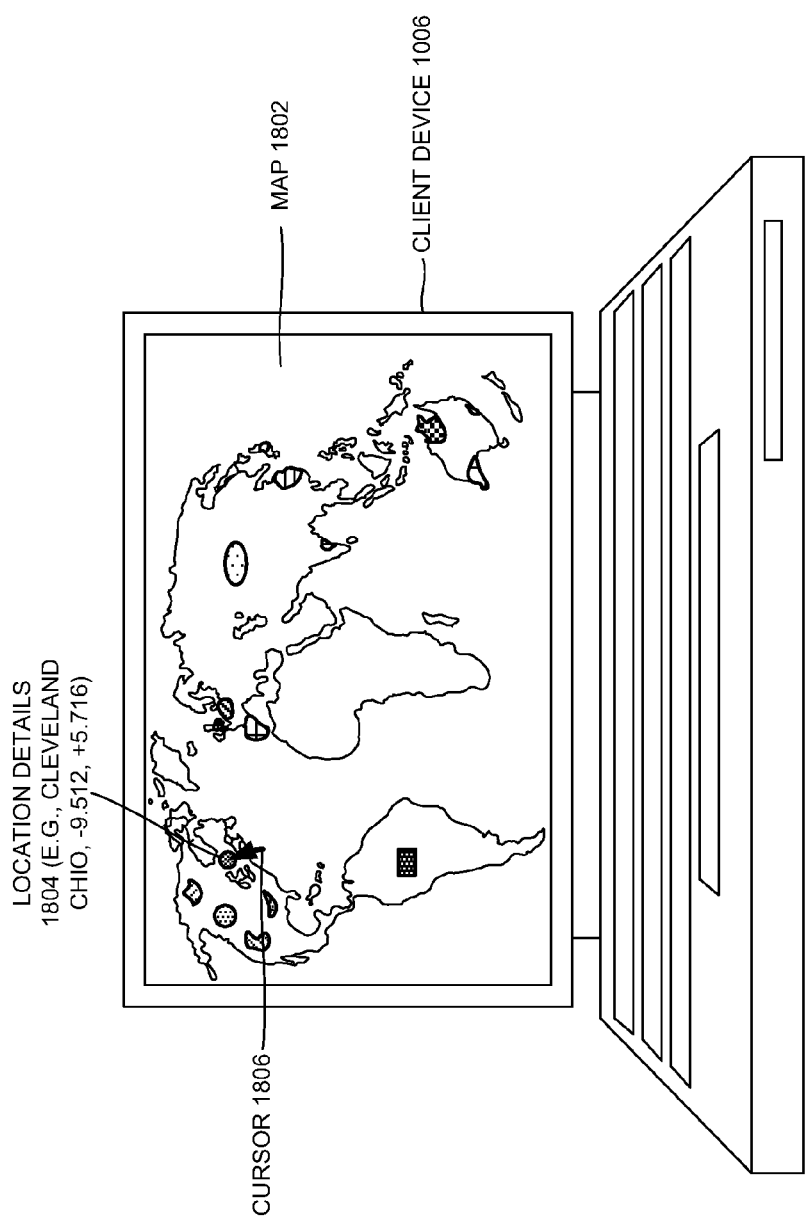
FIG. 18 is a schematic view of discount coupon redemption information on a map, according to one or more embodiments.

FIG. 18 shows discount coupon redemption information on a map 1802 based on the discount coupon(s) being transmitted to mobile phone 304 in FIG. 6, according to one or more embodiments. In one or more embodiments, map generator module 1756 may generate the aforementioned map 1802 based on discount coupon redemption information stored in incentive module 1758. Whenever human mammal 302 or related human mammals redeem the discount coupon(s) transmitted thereto, the redemption process may trigger transmission of profile information thereof to server 402, where the aforementioned information is stored.

In the example embodiment of FIG. 18, map 1802 may be a world map showing highlighted sections where the discount coupons have been redeemed. Entity representative 1208 of FIG. 12, for example, may be able to see the details of location(s) (e.g., location details 1804 showing location name and geospatial coordinates) associated with discount coupon redemption upon clicking/moving a cursor 1806 on a display screen of client device 1204.

Figure 19:
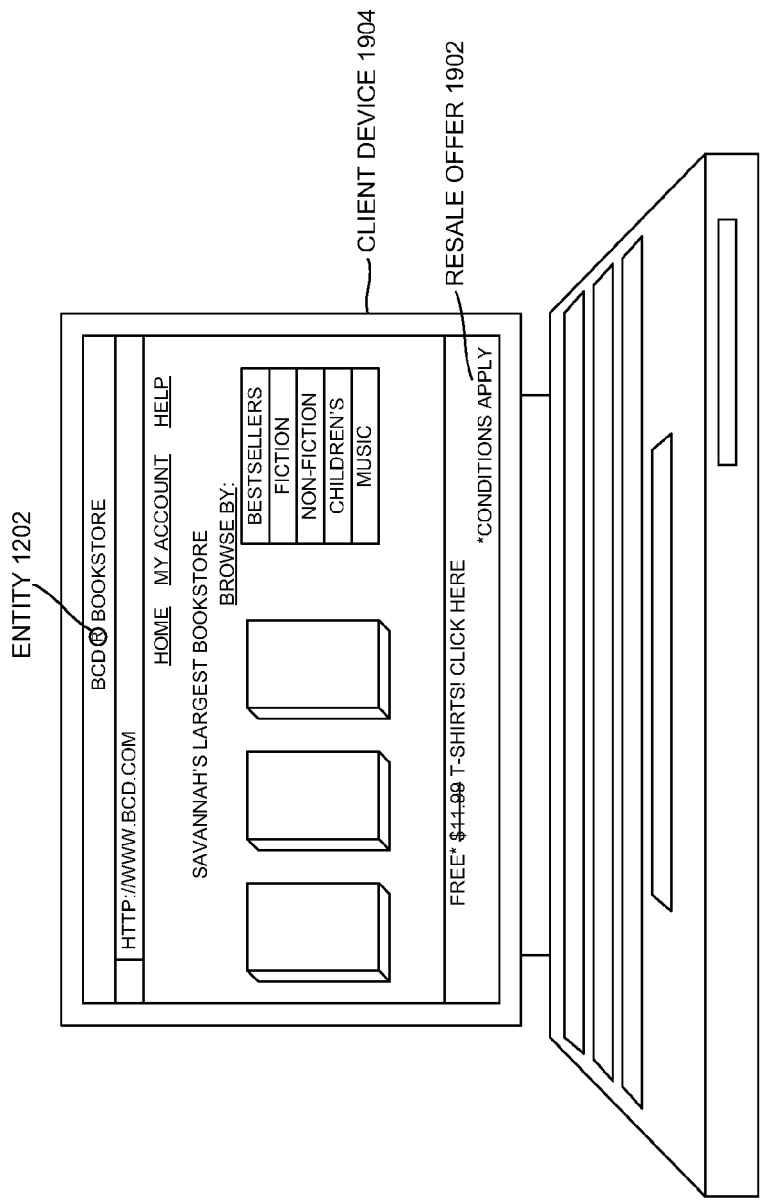
FIG. 19 is a schematic view of an example resale scenario involving the entity of FIG. 12 as a bookstore.

FIG. 19 shows an example resale scenario involving entity 1202 as a bookstore. In one or more embodiments, entity 1202, upon purchasing wearable apparel garment(s) 100 (e.g., t-shirts through entity representative 1208) through vendor 1004, may offer at least a portion of the aforementioned garment(s) 100 for resale at a lower price compared to a retail price thereof, or, for free to customers subject to one or more condition(s). For example, following the purchase of 1000 t-shirts for $4000 from vendor 1004 in FIG. 10, entity 1202 may offer, through a web-store of a server device associated therewith, at least a portion of the aforementioned t-shirts for (1) a reduced price compared to a retailed price thereof and/or or (2) free of cost to those who read near-field communication tag 104 as an incentive to socially propagate wearing of wearable apparel garment(s) 100.

A user of a client device 1904 of FIG. 19 may stumble upon a website of entity 1202 (e.g., BCD® bookstore) and/or the special offer on the t-shirts during an Internet browsing session. Alternately, the user of client device 1904 may load the website of entity 1202 on a browser thereon. As shown in FIG. 19, the user of client device 1904 may click on resale offer 1902, a summary of which is provided at a strategic location on the website of entity 1202. Upon clicking an active portion of the website associated with resale offer 1902, the user may be provided options associated therewith.

Figure 20:
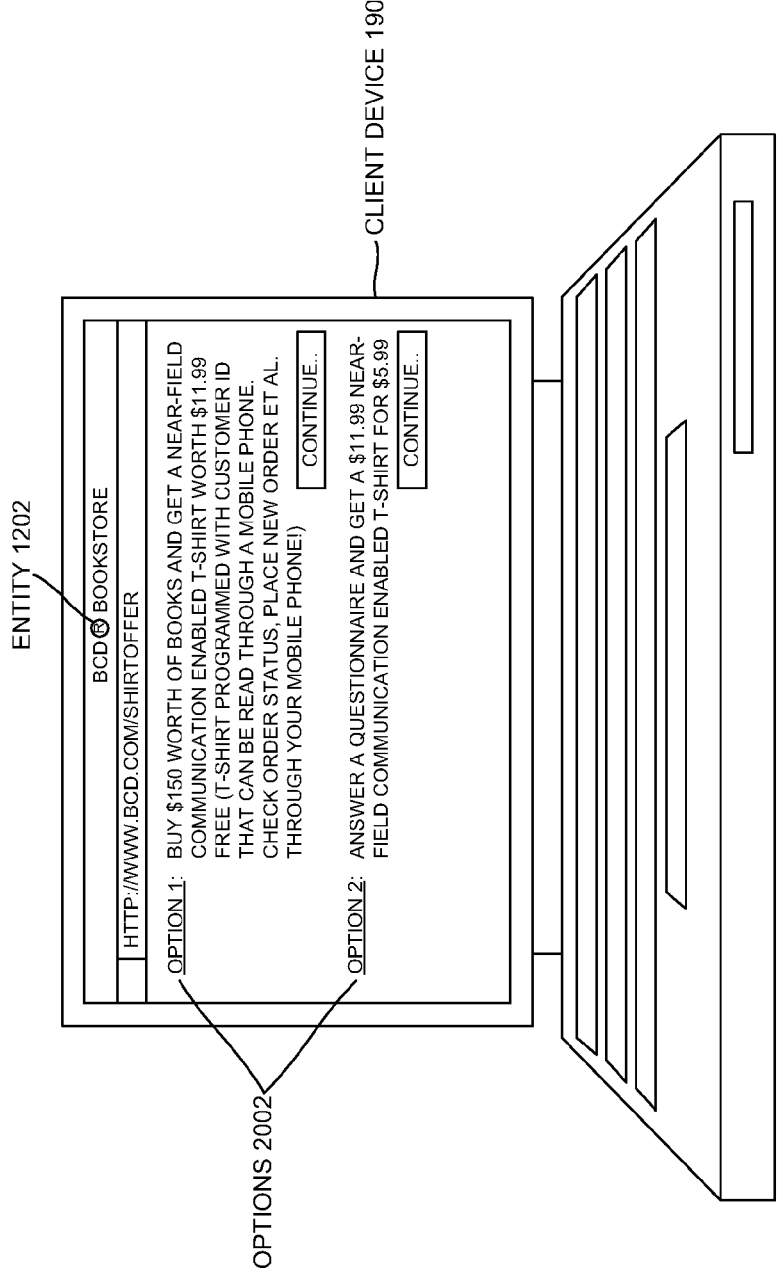
FIG. 20 is a schematic view of example options associated with the resale offer of FIG. 19.

FIG. 20 shows example options 2002 associated with resale offer 1902. Option 1 may include offering wearable apparel garment 100 (as a t-shirt) worth $11.99 retail ($7.99 higher than the average cost of $4 per t-shirt absorbed by entity 1202) for free to the user if the user buys $150 worth of books from entity 1202. Option 2 may include offering wearable apparel garment 100 (as a t-shirt) worth $11.99 retail for $5.99 if the user answers a questionnaire, data of which is collected by entity 1202. Other forms of options 2002 and resale offer 1902 are within the scope of the exemplary embodiments.

Alternately, entity 1202 may elect to have a portion of t-shirts (examples of wearable apparel garment(s) 100)

placed in a store associated therewith based on the "tagging" thereof. The user may purchase a t-shirt for a price (e.g., $5.99) lower than the retail price (e.g., $11.99) and/or may obtain the t-shirt for free (e.g., in person, through a website). The user may "claim" the t-shirt thereof (e.g., to tie a unique identifier therewith) by registering with the website of entity 1202 and/or answering a questionnaire. In an example embodiment, the user may also have to agree to one or more terms during the "claim" process.

In an example scenario, BCD bookstore may have a $100,000 sweepstakes "giveaway" associated therewith. The wearer/purchaser of each t-shirt may secure a bonus entry into the sweepstakes whenever the t-shirt is "tagged." When the t-shirt is "tagged," the human mammal associated with the tagging may also secure an automatic entry into the sweepstakes and/or may be eligible to obtain a t-shirt. Thus, the chances of the wearer/purchaser (or, the t-shirt associated therewith) may double each time the t-shirt associated therewith is "tagged." In the allocation of at least a portion of the 1000 t-shirts purchased by entity 1202 for resale discussed above, the t-shirts associated with the portion may be given away and/or sold at a discount price to the human mammal(s) associated with the "tagging" of the t-shirts. Other implementations are within the scope of the exemplary embodiments.

Another example will now be described. In this one example embodiment, shirts (examples of wearable apparel garment(s) 100) may be sold through a customized website called 'TagMeShirts.com.' These shirts may be manufactured in advance of sale, with embedded near field communication tags 104 built into a sleeve area of each shirt. Each near-field communication tag 104 on each shirt may be coated with a material (e.g., polyethelene or the like) that permits communication between a reader device (e.g., mobile phone 304) and near-field communication tag 104, but protects the tag against water damage, sun damage and/or drying machine damage for at least 50 washes/drys in a washing machine.

Prior to the selling of the shirts, say for example having serial numbers 1000 to 2000, new custom URLs may be created on 'TagMeShirts.com' for each near-field communication tag 104. Near-field communication tags 104, therefore, can be write-once tags, so that once a URL is programmed to the 'TagMeShirts.com' website, it is fixed for the life of the shirt. For example, URLs such as http://www.tagmeshirts.com/1001, http://www.tagmeshirts.com/1002 etc. may be created. These URLs can serve as portals through which interaction with the shirts can be tracked and managed. For example, each URL can have preloaded default Cascading Style Sheets (CSS)/Hypertext Markup Language (HTML) script that requests a geospatial location of the reader device (e.g., mobile phone 304) that reads a near-field communication tag 104 ID (e.g., 1002) matching the URL (e.g., http://www.tagmeshirts.com/1002). In one or more embodiments, the URLs can be rewritten through a URL rewriting algorithm based on a preference of a purchaser of the shirt right at the time of ordering the shirts (e.g., when the purchaser orders in bulk), or, later upon claiming of the shirt by a wearer thereof.

Whenever a user purchases shirts through 'http://www.TagMeShirts.com,' shirts having a set of near-field communication tags 104 and URLs associated therewith may be reserved. Then, the purchaser is asked whether they would (1) like to request geospatial information from those who read tags on shirts thereof, (2) like to request profile information (e.g., Facebook profile, or, fan 'like') from those who read tags on shirts thereof, (3) like to list a portion of the shirts they buy, or, an additional quantity, on a tagme store for sale/giveaway/tagger incentivized that can be customized by the purchaser at the time of purchase, (4) like to offer an incentive to the wearer of the shirt, (5) like to upload an image with an incentive for viewers of the shirt (e.g., a coupon, a sweepstakes entry, a discount, an offer, a social connection, a donation request), (6) like to use an online tagme shirt design creator to create an incentive directly on the shirt, and/or (7) like the reserved URLs thereof on http://www.tagmeshirts.com to be redirected (e.g., to http//www.tagmeshirts.com/1001), and/or like the information to be displayed on the URLs for each near-field communication tag 104.

Then, all the URLs associated with purchased shirts can be automatically, aggregately and algorithmically programmed at once by the server on which www.TagMeShirts.com is located, to ensure that all near-field communication tags 104 associated with the shirts (e.g., or other apparel) purchased by the purchaser may be automatically redirected to the correct URL and/or have the correct information collection preferences (e.g., geo-spatial preferences, Facebook profile requests, etc.). When a user of a reader device (e.g., mobile phone 304, which is a mobile phone that reads near-field communication tag 104 by tapping the shoulder of a shirt of a wearer) arrives at a URL on the www.TagMeshirts.com website, then the preferences of the purchaser may be applied and a URL redirect action and/or other action(s) may be performed.

The purchaser of the shirts may be able to also print out "receipt" pages, each having an incentive that the purchaser customized when buying the shirts. These "receipt" pages can be included by the purchaser with shirts that they receive in the mail, and/or placed along with the shirts that they receive. That way, when shirts are given away to people, each shirt may have a receipt page in which the purchaser/wearer can see an incentive for wearing the shirt (e.g., get 5 people to claim the coupon on this shirt, receive $200 in the mail), and be able to 'register' the shirt thereof on the www.tagmeshirts.com website to receive the incentives associated therewith. In one embodiment, the incentive may be associated with a human mammal (e.g., human mammal 302) reading near-field communication tag 104 also obtaining a shirt and/or being able to get additional incentives when users tag the aforementioned human mammal (e.g., human mammal 302) wearing the shirt (e.g., additional entries into a $10 million dollar sweepstakes competition every time someone tags the shirt and/or an entry for the tagger too, creating a social 'game' having incentives for both a wearer and a reader/tagger of a shirt).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer device). Accordingly, the specification and drawings are to be regarded in an illustrative rather than a restrictive sense.

What is claimed is:

1. A method comprising:

providing, through a server device, a plurality of wearable apparel garments to an entity, each wearable apparel garment of the plurality of wearable apparel garments including:

a textile region configured to cover an epidermis region of a human mammal;
a near-field communication tag, coated with a water-resistant material that is configured to protect a memory region, coupled to the textile region of the wearable apparel garment at an externally visible area thereof;
a message communication area adjacent to the near-field communication tag, coated with a water-resistant material to protect against water and corrosive washing, configured to direct a responsive action of another human mammal in establishing a communication link between a reader device of the another human mammal and the near-field communication tag;

monitoring readings of the near-field communication tags associated with the plurality of wearable apparel garments procured from the entity through a plurality of reader devices of a corresponding plurality of another human mammals;

transmitting, through the communication link, at least one of a profile information of the human mammal wearing the wearable apparel garment to the reader device of the another human mammal to enable a communication link between the human mammal and other human mammals;

generating a set of statistics associated with a count of a number of reads of the near field communication tag of the human mammal and the other human mammals;

providing a recognition to the human mammal based on the set of statistics;

placing any user that reads the near-field communication tags into a chance based drawing associated with the recognition;

creating a social connection between the human mammal and the other human mammal in a social community such that the human mammal and the other human mammal establish a social connection between each other in the online social community based on a time-stamped physical meeting event based on the reading of a particular near-field communication tag on a wearable apparel garment;

capturing a geospatial information of both the human mammal and the other human mammal based on a present geospatial location of the wearable apparel garment through a mobile device of the other human mammal presently reading the near-field communication tag on the wearable apparel garment to a central server to establish the social connection;

wherein said geospatial information of the reader device to the central server configured to collect information from the plurality of reader devices when the near-field communication tag is read by the another human mammal identifies a path of the human mammal through a set of points defining the movement of the human mammal as defined through various locations of the wearable apparel garment to identify a set of potential customers associated with a product offered by a creator of the message communication area adjacent to the near-field communication tag;

incentivizing the human mammal wearing the near-field communication tag coupled to the textile region of the wearable apparel of the human mammal when the near-field communication tag is read by the reader device of the another mammal, wherein an incentive delivered to the human mammal is distinct and separate from any incentives provided to the reader device upon tagging the near-field communication tag of the human mammal by the another human mammal, wherein the human mammal registers a unique identifier of the wearable apparel is registered on the server device; and obtaining, through at least one of the server device and another server device, information related to market intelligence based on the transmitted at least one of the profile information of the human mammal based on a set of permissions provided by the other human mammal through the mobile device that grants a permission to transmit the geospatial information to the central server;

allowing for tagged wearable apparel garments to be resold by third party retailers for a reduced price or given away for free;

optionally providing, through a web-store of the at least one of the server device and the another server device, at least a portion of the plurality of wearable apparel garments for at least one of: a reduced price compared to a retail price thereof and free of cost to those who read a near-field communication tag to socially propagate wearing of the wearable apparel garments;

describing, through the message communication area, an incentive to the another human mammal when the another human mammal establishes the communication link with the near-field communication tag;

delivering the incentive to the reader device of the another human mammal through a browser that activates a Uniform Resource Locator (URL) page whose identity is revealed through the communication link with the near-field communication tag;

providing, to the human mammal possessing the wearable apparel garment, a capability to program the near-field communication tag associated therewith; and providing, to a transferor of the wearable apparel garment, a capability to simultaneously program the near-field communication tag along with other near-field communication tags of the plurality of wearable apparel garments through a tag definition website, wherein near-field communication tags may be write-once tags, so that new custom URLs programmed to direct any read of the near-field communication tags to a website that automatically generates a set of markup language pages that correspond to each unique identifier of each near-field communication tag on the wearable apparel garment, wherein the another server device is associated with the entity and the method further comprises providing, through the server device, a subscription service to the entity associated with access to the information related to market intelligence, wherein the communication link is configured to open a browser on the reader device on which the profile information associated with the human mammal is displayed, wherein the incentive is at least one of a coupon having a monetary value associated therewith and an entry into a drawing of chance having a prize associated therewith, and wherein the communication link is configured to enable opening of at least one of a personal webpage, a dating profile, a social networking profile and a business networking profile associated with the human mammal on the reader device of the another human mammal based on a URL information stored in the near-field communication tag being transmitted to the reader device, wherein the wearable apparel garment is at least one of a shirt, a jacket, a hat and a glove, the externally visible area of the textile region is a shoulder area of the shirt, wherein the near-field communication tag is coated with a water-resistant material that is configured to protect a memory region and a communication area associated therewith from water and corrosive washing while permitting the reading thereof through the reader device, wherein the near-field communication tag is one of sewn onto the externally visible area of the textile region and removably attached thereto, wherein the reader device of the another human mammal is a near-field communication enabled mobile phone, wherein the reader device includes an appropriate tag reader to read the near-field communication tag, and wherein the near-field communication tag is a passive tag configured to be powered by the reading thereof by the reader device.

\* \* \* \* \*